United States Patent
Shima et al.

(10) Patent No.: US 8,592,495 B2
(45) Date of Patent: Nov. 26, 2013

(54) THERMOPLASTIC RESIN COMPOSITE BEAD PRODUCTION METHOD, EXPANDABLE THERMOPLASTIC RESIN COMPOSITE BEAD, EXPANDED THERMOPLASTIC RESIN COMPOSITE BEAD, AND FOAMED MOLDED ARTICLE FORMED FROM EXPANDED THERMOPLASTIC RESIN COMPOSITE BEADS

(75) Inventors: Masaomi Shima, Mie (JP); Mitsuru Shinohara, Mie (JP)

(73) Assignee: JSP Corporation, Tokyo (JP)

( * ) Notice: Subject to any disclaimer, the term of this patent is extended or adjusted under 35 U.S.C. 154(b) by 21 days.

(21) Appl. No.: 13/290,473

(22) Filed: Nov. 7, 2011

(65) Prior Publication Data

US 2012/0115968 A1 May 10, 2012

(30) Foreign Application Priority Data

Nov. 9, 2010 (JP) ................... 2010-250520

(51) Int. Cl.
- *C08J 9/18* (2006.01)
- *C08J 9/16* (2006.01)
- *C08J 9/228* (2006.01)
- *C08J 9/00* (2006.01)

(52) U.S. Cl.
USPC .............. 521/59; 521/60; 521/56; 521/76; 428/202.22

(58) Field of Classification Search
USPC .............................. 521/59, 60, 82
See application file for complete search history.

(56) References Cited

U.S. PATENT DOCUMENTS

| 5,622,756 A * | 4/1997 | Tokoro et al. ............... 428/36.5 |
| 2003/0011091 A1 * | 1/2003 | Tokoro et al. ............... 264/46.4 |

FOREIGN PATENT DOCUMENTS

| JP | 45-32623 | 10/1970 |
| JP | 48-101457 | 12/1973 |
| JP | 49-5473 | 1/1974 |
| JP | 49-97884 | 9/1974 |
| JP | 52-32990 | 3/1977 |
| JP | 1-284536 | 11/1989 |
| JP | 5-177723 | 7/1993 |
| JP | 8-108441 | 4/1996 |

* cited by examiner

*Primary Examiner* — Randy Gulakowski
*Assistant Examiner* — Kara Boyle
(74) *Attorney, Agent, or Firm* — Oblon, Spivak, McClelland, Maier & Neustadt, L.L.P.

(57) ABSTRACT

A seed beads dispersing disperse system is obtained by dispersing olefin resin seed beads 1 with a specific tubular shape in an aqueous medium. Then, the olefin resin seed beads 1 are impregnated with styrene monomers and the styrene monomers are polymerized in the presence of a polymerization initiator by heating at a temperature in a specified range, to thereby obtain tubular thermoplastic resin composite beads. Expandable thermoplastic resin composite beads obtained by impregnating the thermoplastic resin composite beads with a blowing agent, expanded thermoplastic resin composite beads obtained by foaming and expanding the expandable thermoplastic resin composite beads, and a foamed molded article formed from the expanded thermoplastic resin composite beads by molding are also obtained.

7 Claims, 4 Drawing Sheets though lower than that in the case where the butane is used. In view of this, in this case, only the manufacturing of expandable resin beads may be performed at a factory where the expandable resin beads are manufactured and then the expandable resin

THERMOPLASTIC RESIN COMPOSITE BEAD PRODUCTION METHOD, EXPANDABLE THERMOPLASTIC RESIN COMPOSITE BEAD, EXPANDED THERMOPLASTIC RESIN COMPOSITE BEAD, AND FOAMED MOLDED ARTICLE FORMED FROM EXPANDED THERMOPLASTIC RESIN COMPOSITE BEADS

CROSS-REFERENCES TO RELATED APPLICATIONS

The present application claims priority under 35 U.S.C. §119 to Japanese Application No. 2010-250520, filed Nov. 9, 2010, entitled "THERMOPLASTIC RESIN COMPOSITE BEAD PRODUCTION METHOD, EXPANDABLE THERMOPLASTIC RESIN COMPOSITE BEAD, EXPANDED THERMOPLASTIC RESIN COMPOSITE BEAD, AND FOAMED MOLDED ARTICLE FORMED FROM EXPANDED THERMOPLASTIC RESIN COMPOSITE BEADS." The contents of this application are incorporated herein by reference in their entirety.

BACKGROUND OF THE INVENTION

1. Field of the Invention

The present invention relates to a method of producing a tubular thermoplastic resin composite bead, a tubular expandable thermoplastic resin composite bead, a tubular expanded thermoplastic resin composite bead, and a foamed molded article formed from expanded thermoplastic resin composite beads with continuous bore spaces.

2. Description of the Related Art

Foamed molded articles, which are obtained by mutually fusing and bonding thermoplastic resin expanded beads in a mold for shaping, are widely used in various applications such as packaging materials, construction materials, and impact energy absorbing materials for vehicles because of their excellent properties like energy absorbing properties, light-weight properties, thermal insulating properties, etc.

There is proposed, as the foamed molded article, a styrene modified olefin resin foamed molded article that employs a styrene modified olefin resin as a base resin (see Patent Documents 1-6). The styrene modified olefin resin foamed molded article is obtained by using expandable resin beads that are prepared, for instance, in a way described below.

That is, olefin resin beads composed of polyethylene, for example, are impregnated with vinyl aromatic monomers such as styrene monomers. Then, the vinyl aromatic monomers are polymerized in the olefin resin beads, thereby obtaining a styrene modified olefin resin beads.

Thereafter, the styrene modified olefin resin beads are impregnated with a hydrocarbon blowing agent such as propane, butane, and pentane. As a result, the expandable resin beads that employ a styrene modified olefin resin as a base resin are formed.

Where butane is used as a blowing agent for the styrene modified olefin resin beads, the speed with which butane is dissipated from the base resin is relatively high, so the conventional preexpansion is usually performed at the same factory that expandable resin beads are manufactured to produce the expanded beads, and then the expanded resin beads are conveyed to factories where a molded article is produced. Instead, where pentane is used as a blowing agent, the speed with which pentane is dissipated from the base resin is slower than the case where the butane is used, so the expandable resin beads may be conveyed without preexpansion to produce expanded beads for molding is performed at a factory where a molded article is produced. In either case, a foamed molded article formed from expanded resin beads can be produced by in-mold molding.

Accordingly, in the case where a styrene modified olefin resin is employed as a base resin to produce expandable resin beads prepared to manufacture a foamed molded article, equipment for producing a molded article formed with expanded styrene resin beads, for example, is partly or wholly utilized. Because of this, initial investment is not required for producing a foamed molded article formed from expanded polyolefin resin beads, and a foamed molded article formed from expanded beads may be produced in a way to have improved chemical resistance and toughness by using expanded styrene modified olefin resin beads. The foamed molded article formed from expanded beads has been widely used in various applications such as impact energy absorbing materials such as bumpers and tibia pads, cushioning materials for home electronic appliances, and containers for transporting liquid crystal glass panels.

There is a type of foamed molded article formed from expanded beads that has a high porosity. A general foamed molded article (i.e., a foamed molded article in which bore spaces are not formed) is formed by performing post-expanding of expanded beads, so that the expanded beads are fusion bonded together in a way to fill voids formed between the expanded beads. In contrast, a foamed molded article with high porosity has been formed by fusion-bonding the expanded beads so as not to allow the voids formed between the expanded particles to be filled thoroughly. In order to obtain such a high porosity of foamed molded article, special molding equipment and control were required in the past. Due to this, it was difficult to produce a foamed molded article having a high porosity, and excellent mutual fusion properties among the expanded beads according to the conventional production methods of in-mold molding.

In view of this, there is proposed a method of producing a foam molded article having continuous bore spaces as described above without using special equipment. According to this method, a plurality of foam chips, having a length of 2 cm or more in its longest portion and a non-spherical shape, are mutually fused together in a mold (see Patent Document 7).

Further, there is proposed a method of molding tubular expanded beads in a mold. According to this method, first, polyolefin resin is melted by an extruder. Then polyolefin resin is extruded in a tubular strand-shape from a die attached to a tip end of the extruder and cut. Thereby tubular resin beads are obtained. Thereafter, the tubular resin beads are dispersed in an aqueous medium in a closed pressure vessel, such as an autoclave, and a physical blowing agent is pressed into the pressure vessel. After that the softened tubular resin beads containing the blowing agent are released from the pressure vessel together with the aqueous medium to obtain the tubular expanded beads. And the tubular expanded beads are molded in a mold (see Patent Document 8).

Patent document 1: JP49-97884 Unexamined Patent Publication (Kokai)
Patent document 2: JP52-32990 Unexamined Patent Publication (Kokai)
Patent document 3: JP45-32623 Examined Patent Publication (Kokoku)
Patent document 4: JP01-284536 Unexamined Patent Publication (Kokai)
Patent document 5: JP48-101457 Unexamined Patent Publication (Kokai)

Patent document 6: JP49-5473 Unexamined Patent Publication (Kokai)
Patent document 7: JP05-177723 Unexamined Patent Publication (Kokai)
Patent document 8: JP08-108441 Unexamined Patent Publication (Kokai)

SUMMARY OF THE INVENTION

However, there is a tendency that spaces formed between the foam chips are not uniform in size due to the long length of the chip that is 2 cm or more in its longest portion. Due to this, the filling density of the foam chips is apt to vary depending on the location of the chips in a molding. Further, the filling density of the foam chips is apt to vary for each filling. As a result, it is hard to control the filling ratio of the foam chips and also the porosity of the resultant foamed molded article in a specified value. For the same reason, the area where the foam chips contact each other is small, and therefore, the foam molded article is damaged easily and breakable as a whole.

The foamed molded article formed from expanded polyolefin resin beads having continuous bore spaces therein may be obtained by molding tubular expanded polyolefin resin beads obtained by expanding resin beads prepared by cutting strands being extruded so as to have a tubular shape. On the other hand, the styrene modified olefin resin beads are prepared by performing impregnation of olefin resins with styrene and their polymerization in a reaction chamber. Therefore, the extrusion process cannot be adopted for preparing styrene modified olefin resin beads in view of their production process. As a result, tubular styrene modified olefin resin beads cannot be obtained by only adopting the normal extrusion process.

Accordingly, it has not yet been obtained a foamed molded article formed from expanded beads so as to have spaces as described above, and which is shaped by molding with expanded beads that employ, as a base resin, a modified resin being prepared by performing impregnation of an olefin resin with styrene and performing polymerization thereof.

The present invention was made in view of these problems and an object of the present invention is to provide a method of producing a tubular thermoplastic resin composite bead which contains an olefin resin and a styrene resin, and which may be used for producing a foamed molded article formed from expanded thermoplastic resin composite beads having a high porosity, to be excellent in mutual fusion-bonding of expanded beads and to have an improved mechanical strength. Another object of the present invention is to provide a tubular expandable thermoplastic resin composite bead; a tubular expanded thermoplastic resin composite bead; and a foamed molded article formed from expanded thermoplastic resin composite beads having continuous bore spaces therein.

A first aspect of the present invention is based on a finding that a tubular resin bead composed of a styrene modified olefin resin, which could not be obtained before, can be obtained by employing an olefin resin with a specific shape as a seed bead, impregnating the seed bead with a styrene monomer, and performing polymerization at a temperature in a specific range.

That is to say, the first aspect of the present invention resides in a method of producing an open-ended tubular thermoplastic resin composite bead containing an olefin resin and a styrene resin. "An open-ended tubular" is an equivalent for a shape having a through hole extending inside the bead throughout its length. The method includes a dispersion step of dispersing olefin resin seed beads in an aqueous medium to obtain a seed beads dispersing disperse system, and a polymerization step comprising impregnating the olefin resin seed beads with styrene monomers by adding the styrene monomers to the disperse system, and then heating the olefin resin seed beads in the presence of a polymerization initiator to polymerize the styrene monomers, thereby obtaining the thermoplastic resin composite beads.

The olefin resin seed beads to be dispersed in the aqueous medium have an open-ended tubular shape, a smallest inner diameter P1 (mm) of not less than 0.4 mm, a height H of 0.5 to 5 mm, and a smallest outer diameter L1 (mm), wherein the value of a ratio of P1 to L1 (P1/L1) is 0.25 to 0.85.

The value of a ratio ($P1_H/L1$) of a smallest inner diameter $P1_H$ of the olefin resin seed bead after undergoing a heating treatment to the smallest inner diameter P1 of the olefin resin seed bead before undergoing the heating treatment is 0.8 to 2.0, wherein the heating treatment is performed such that the olefin resin seed beads are heated in water having a temperature of [Tm−25]° C. for 120 minutes, wherein Tm(° C.) represents a melting point of the olefin resin seed bead.

The amount of the styrene monomers to be added is not less than 30 parts by mass and less than 90 parts by mass per 100 parts by mass in total of the olefin resin seed beads and the styrene monomers added.

A maximum heat temperature in the polymerization step, in condition that a polymerization conversion rate of the styrene monomers is in the range of 0 to 80%, is in the range of [Tm−45] to [Tm−15]° C. on the basis of the melting point Tm(° C.).

A second aspect of the present invention resides in an open-ended tubular expandable thermoplastic resin composite bead obtained by impregnating an open-ended tubular thermoplastic resin composite bead with a physical blowing agent.

The thermoplastic resin composite bead is prepared by impregnating an open-ended tubular olefin resin seed bead with a styrene monomer, and polymerizing them.

The expandable thermoplastic resin composite bead has a smallest inner diameter P2 (mm) of not less than 0.4 mm and a smallest outer diameter L2 (mm), wherein the value of a ratio of P2 to L2 (P2/L2) is 0.25 to 0.85.

A third aspect of the present invention resides in an open-ended tubular expanded thermoplastic resin composite bead obtained by expanding the expandable thermoplastic resin composite bead according to the second aspect of the present invention, wherein a bulk density of the expanded thermoplastic resin composite beads is 10 to 500 kg/m³, and the expanded bead has a smallest inner diameter P3 (mm) of not less than 1.5 mm, and a smallest outer diameter L3 (mm), wherein the value of a ratio of P3 to L3 (P3/L3) is 0.25 to 0.85.

A fourth aspect of the present invention resides in a foamed molded article formed from expanded thermoplastic resin composite beads, the article being obtained by molding the expanded thermoplastic resin composite beads according to the third aspect of the present invention in a mold, wherein the foamed molded article has a bulk density of 10 to 500 kg/m³, a porosity of 10 to 60%, and a degree of fusion-bonding among the expanded beads of 60% or more.

The dispersion step and the polymerization step are performed in the production method according to the first aspect of the present invention. As a result, the olefin resin seed beads are impregnated with the styrene monomers and the styrene monomers are polymerized, thereby obtaining the tubular thermoplastic resin composite beads.

The tubular thermoplastic resin composite bead prepared according to this production method may be used for producing an expanded thermoplastic resin composite bead by foaming and expanding the thermoplastic resin composite bead. The tubular thermoplastic resin composite bead prepared according to this production method may be also used for producing a foamed molded article formed from expanded beads (i.e., a foamed molded article formed from expanded thermoplastic resin composite beads) by molding the expanded thermoplastic resin composite beads. By using the tubular thermoplastic resin composite bead, firstly obtained by this production method, the foamed molded article formed from expanded thermoplastic resin composite beads can be readily produced, by the well-known in-mold molding without special equipment, so as to have a high porosity, to be excellent in mutual fusion-bonding of the expanded beads, and to have an improved mechanical strength.

The expandable thermoplastic resin composite bead according to the second aspect of the present invention is obtained by impregnating a tubular thermoplastic resin composite bead with a physical blowing agent. Further, the expandable thermoplastic resin composite bead is formed to have a specified tubular shape, as described above. Due to this, by foaming and expanding the expandable thermoplastic resin composite bead, a tubular thermoplastic resin composite expanded bead with a through hole is obtained. Accordingly, by using the expandable thermoplastic resin composite beads, a foamed molded article formed from the expanded thermoplastic resin composite beads can be produced, by existing apparatus without special equipment, so as to have a high porosity, to be excellent in mutual fusion-bonding of the expanded beads, and to have an improved mechanical strength.

The expandable thermoplastic resin composite bead according to the second aspect of the present invention is prepared, as described above, by impregnating an open-ended tubular thermoplastic resin composite bead with a physical blowing agent, wherein the thermoplastic resin composite bead is prepared by impregnating an open-ended tubular olefin resin seed bead with a styrene monomer and polymerizing them. Specifically, the expandable thermoplastic resin composite bead according to the second aspect of the present invention can be easily obtained by impregnating the tubular thermoplastic resin composite bead obtained according to the production method of the first aspect of the present invention with a physical blowing agent.

The expanded thermoplastic resin composite bead according to the third aspect of the present invention has an open-ended tubular shape and is obtained by foaming and expanding the tubular expandable thermoplastic resin composite bead. In addition, the expanded thermoplastic resin composite bead is formed to have a specific bulk density and a specific shape, as described above. Accordingly, by using the expanded thermoplastic resin composite bead, a foamed molded article formed from expanded thermoplastic resin composite beads can be produced, by known in-mold molding without special equipment, so as to have a high porosity, to be excellent in mutual fusion-bonding of expanded beads, and to have an improved mechanical strength.

The foamed molded article formed from expanded thermoplastic resin composite beads according to the fourth aspect of the present invention is obtained by molding the tubular expanded thermoplastic resin composite beads, which are prepared by using the thermoplastic resin composite beads. The foamed molded article formed from expanded thermoplastic resin composite beads has a specific bulk density, porosity, and degree of fusion-bonding among expanded beads as described above. Due to this, the foamed molded article formed from expanded thermoplastic resin composite beads has a high porosity, and be excellent in mutual fusion-bonding of the expanded beads, and has an improved mechanical strength. Accordingly, the foamed molded article formed from expanded thermoplastic resin composite beads is excellent in thermal insulating properties, shock absorbing properties, sound absorption properties, and light-weight properties. Further, the foamed molded article is especially excellent in mechanical strength such as bending strength and compression strength.

DESCRIPTION OF THE PREFERRED EMBODIMENTS

Figure 1:
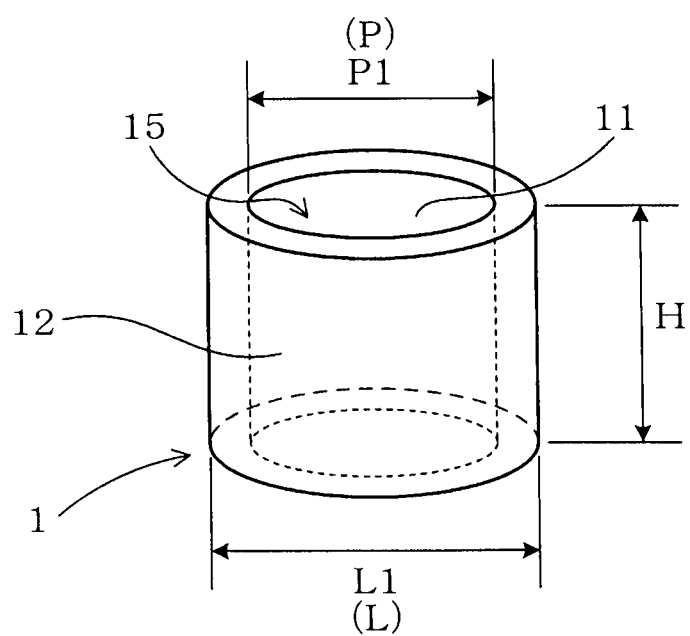
FIG. 1 is a view illustrating a tubular olefin resin seed bead in a state that the inner wall and the outer peripheral side wall of the bead have a generally straight shape according to an embodiment.

The preferred embodiments of the present invention will be described.

The thermoplastic resin composite bead uses, as a base resin, a composite resin formed in a way that dispersion phases (domain) mainly composed of a styrene resin are dispersed into a continuous phase (matrix) mainly composed of an olefin resin, for example. It is preferred that the resin bead, when viewed in cross section using a Transmission Electron Microscope, has a sea-island structure in which the dispersion phases having a generally circular grain shape and/or the dispersion phases having a non-uniform grain shape are dispersed in the continuous phase.

Further, the thermoplastic resin composite bead may use, as a base resin, a composite resin formed by a co-continuous phase containing a continuous phase that is mainly composed of a styrene resin and a continuous phase that is mainly composed of an olefin resin. Still further, the thermoplastic resin composite bead may use, as a base resin, a composite resin formed in a way that dispersion phases mainly composed of an olefin resin are dispersed into a continuous phase mainly composed of a styrene resin.

As the olefin resin, an ethylene resin, a propylene resin, etc., is exemplified for example. A mixture of one type or different types of resins selected from these may be used. Examples of the ethylene resin include such as low density polyethylene, linear low density polyethylene, high density polyethylene, an ethylene-vinyl acetate copolymer, an ethylene-acrylic acid copolymer, an ethylene-alkyl acrylate copolymer, and an ethylene-alkyl methacrylate copolymer. Examples of the propylene resin include such as a propylene homopolymer, a propylene-ethylene copolymer, a propylene-1-butene copolymer, a propylene-ethylene-1-butene copolymer, and a propylene-4-methylpentene-1 copolymer. It is preferred that the linear low density polyethylene, the ethylene-vinyl acetate copolymer or a mixture of these is used in view of their superior strength.

Examples of the styrene resin include a polystyrene and a copolymer of a styrene and a monomer copolymerizable with the styrene. Examples of the monomer copolymerizable with the styrene include alkyl ester having C1-C10 acrylic acids, alkyl ester having C1-C10 methacrylic acids, styrene derivatives, and nitrile group-containing unsaturated compounds. Examples of the alkyl ester having C1-C10 acrylic acids include such as methyl acrylate, ethyl acrylate, propyl acrylate, butyl acrylate, and 2-ethylhexyl acrylate. Examples of the alkyl ester having C1-C10 methacrylic acids include such as methyl methacrylate, ethyl methacrylate, propyl methacrylate, butyl methacrylate, and 2-ethylhexyl methacrylate. Examples of the styrene derivative includes such as a-methylstyrene, o-methylstyrene, m-methylstyrene, p-methylstyrene, vinyltoluene, p-ethylstyrene, 2,4-dimethylstyrene, p-methoxystyrene, p-phenylstyrene, o-chlorostyrene, m-chlorostyrene, p-chlorostyrene, 2,4-dichlorostyrene, p-n-butylstyrene, p-t-butylstyrene, p-n-hexylstyrene, p-octylstyrene, styrenesulfonate, and sodium styrenesulfonate. Examples of the nitrile group-containing unsaturated compounds include such as acrylonitrile, and methacrylonitrile. Specifically, as the styrene resin, polystyrene, rubber modified polystyrene, acrylonitrile-butadiene-styrene copolymer, acrylonitrile styrene copolymer, and acrylonitrile-ethylene-styrene copolymer, or a mixture of at least two types selected from these may be exemplified. Polystyrene or a copolymer of styrene and an acrylic monomer such as butyl acrylate is preferably exemplified. As for the copolymer of a styrene and a monomer copolymerizable with the styrene, it is preferred that not less than 50 mass % styrene is included in the copolymer in component unit. In this specification, where an olefin resin is impregnated with a styrene and they are polymerized, the styrene is naturally identified as the styrene monomer. Also, where an olefin resin is impregnated with a styrene and a monomer copolymerizable with the styrene and they are polymerized, the styrene and the monomer copolymerizable with the styrene are identified, in combination, as the styrene monomer.

The olefin resin seed bead contains, preferably, not less than 50 mass %, more preferably not less than 70 mass %, still more preferably not less than 80 mass % of the olefin resin. The olefin resin preferably contains linear low density polyethylene, an ethylene-vinyl acetate copolymer or a mixture of these to enhance its strength.

Although the density of the linear low density polyethylene is generally 0.88 to 0.945 g/cm$^3$, it is preferred to use the linear low density polyethylene that has a density of not more than 0.94 g/cm$^3$, more preferably not more than 0.93 g/cm$^3$.

The ethylene-vinyl acetate copolymer generally has a branch structure of a long chain derived from polyethylene and a short chain derived from vinyl acetate. The ethylene-vinyl acetate copolymer containing 1 to 45 mass % of vinyl acetate (i.e., the content ratio of the monomer derived from vinyl acetate in the copolymer) is commonly used. However, it is preferable to use the ethylene-vinyl acetate copolymer containing 3 to 20 mass % of vinyl acetate, and is more preferable to use the ethylene-vinyl acetate copolymer containing 5 to 15 mass % of vinyl acetate in view of enhancing foaming property and formability.

The resin constituting the olefin resin seed bead preferably contains 60 to 80 parts by mass of the linear low density polyethylene and 40 to 20 parts by mass of the ethylene-vinyl acetate copolymer per 100 parts by mass in total of the linear low density polyethylene and the ethylene-vinyl acetate copolymer.

The olefin resin seed bead may contain, as long as its inherent property is not degraded, resin additives. Examples of the resin additives include such as an inorganic substance, a foaming assistant, a slip agent, an antistatic agent, a flame retardant, a flame retardant assistant, and a coloring agent. The inorganic substance is exemplified by talc, calcium carbonate, silica, titanium oxide, calcium sulfate, zeolite, zinc borate, aluminum hydroxide, carbon, etc. The foaming assistant is exemplified by a phosphate nucleating agent, a phenol nucleating agent, an amine nucleating agent, etc. The flame retardant is exemplified by hexabromocyclododecane, tetrabromobisphenol A, trimethyl phosphate, aluminum hydroxide, etc. The flame retardant assistant is exemplified by 2,3-dimethyl-2,3-diphenylbutane, antimony trioxide, etc. The coloring agent is exemplified by furnace black, channel black, thermal black, acetylene black, ketjen black, graphite, carbon fiber, etc. The talc and the zinc borate function also as a cell adjusting agent for foam cells during foaming and expanding. These resin additives may be added solely or in combination.

As the olefin resin seed bead, a tubular bead is employed which is formed to have a through hole with a smallest inner diameter P1 (mm) of not less than 0.4 mm, have a height H of 0.5 to 5 mm, and have the value of a ratio of the smallest inner diameter P1 to the smallest outer diameter L1 (P1/L1) of 0.25 to 0.85.

With the tubular olefin resin seed bead, a tubular thermoplastic resin composite bead can be produced under specified impregnation and polymerization conditions of a styrene monomer, and which will allow for the production of a tubular expandable thermoplastic resin composite bead, and a tubular expanded thermoplastic resin composite bead. Hereunder, representative examples of the tubular olefin resin seed bead are explained with reference to drawings.

Figure 2:
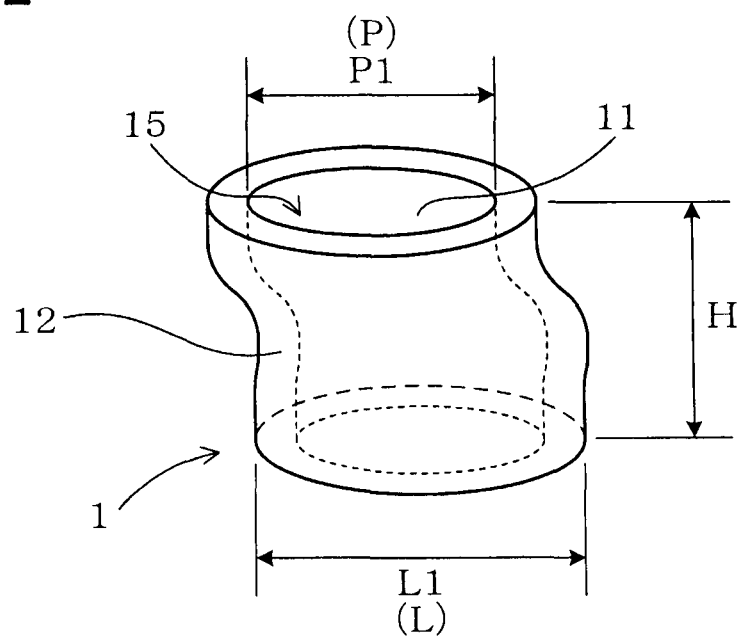
FIG. 2 is a view illustrating a tubular olefin resin seed bead in a state that the inner wall and the outer peripheral side wall of the bead are curved.
Figure 3:
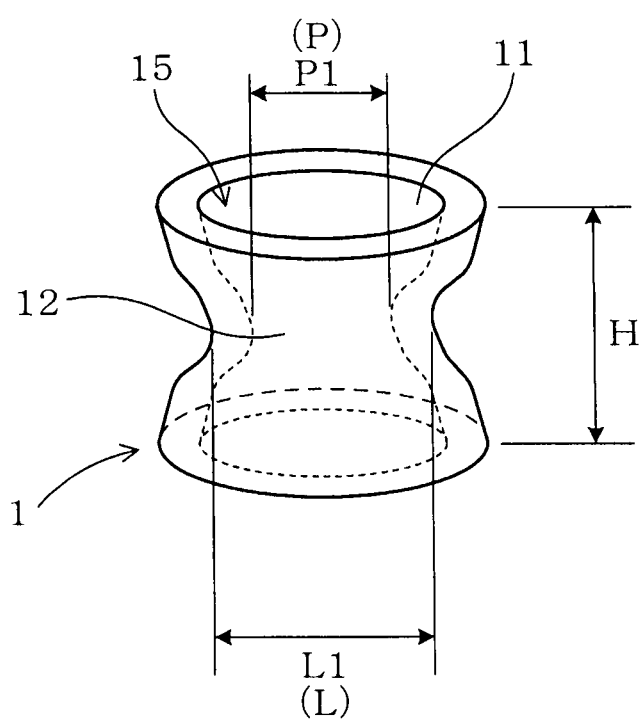
FIG. 3 is a view illustrating a tubular olefin resin seed bead in a state that the inner wall and the outer peripheral side wall of the bead are curved and the inner and outer diameters of the bead vary in a direction in which a through hole extends.

As illustrated in FIGS. 1-3, an olefin resin seed bead 1 has a through hole 15 that passes the seed bead 1, and has a tubular bottomless shape as a whole.

As illustrated in FIG. 1, the tubular olefin resin seed bead 1 (hereinafter referred to as "tubular bead 1" where appropriate) may be shaped, for example, such that an inner wall 11 and an outer peripheral side wall 12 are generally straight, and the diameter of the through hole 15, which is to say, the inner diameter P of the tubular bead 1, and the outer diameter L of the tubular bead 1 are almost uniform, respectively, in any surface in a direction perpendicular to the direction in which the through hole 15 extends. In FIG. 1, the inner diameter P and the outer diameter L are almost uniform, respectively. These may be defined as the smallest inner diameter P1 and the smallest outer diameter L1, respectively both of which will be described later.

Further, as illustrated in FIG. 2, the tubular bead 1 may be shaped such that although the inner wall 11 and the outer circumferential side wall 12 are curved, the diameter of the through hole 15, which is to say, the inner diameter P of the tubular bead 1, and the outer diameter L of the tubular bead 1 are almost uniform, respectively in any surface in a direction perpendicular to the direction in which the through hole 15 extends. Also in the shape of FIG. 2, the inner diameter P and the outer diameter L are almost uniform, respectively. These also may be defined as the smallest inner diameter P1 and the smallest outer diameter L1 respectively, both of which will be described later.

Still further, as illustrated in FIG. 3, the tubular bead 1 may be shaped such that the inner wall 11 and the outer circumferential side wall 12 are curved, and the diameter of the through hole 15, which is to say, the inner diameter P of the tubular bead 1, and the outer diameter L of the tubular bead 1 each vary in a direction in which the through hole 15 extends. In the shape as illustrated in FIG. 3, the inner diameter P and the outer diameter L each vary in a direction in which the through hole 15 extends, and therefore, the inner diameter P that is the smallest one is defined as the smallest inner diameter P1, described later, and the outer diameter L that is the smallest one is defined as the smallest outer diameter L1, described later.

The term "tubular" used for the olefin resin seed bead 1 means a general idea of each shape illustrated in FIGS. 1-3. The same thing is applied for the term "tubular" used for describing the thermoplastic resin composite bead, the expandable thermoplastic resin composite bead, and the expanded thermoplastic resin composite bead.

In FIGS. 1-3, the tubular shape is exemplary illustrated. In addition to these, the olefin resin seed bead 1 may be shaped, for example, such that the outer circumferential side wall is not a perfect circular, but is an elliptic, an elongated circular, or a polygonal when viewed in cross section perpendicular to the direction in which the through hole extends, that the inner wall is not a perfect circular but is an elliptic, an elongated circular, or a polygonal in the cross section, that the through hole is formed to be deviated from the center, and that the tubular shape is formed to twist.

Where the smallest inner diameter P1 of the olefin resin seed bead is less than 0.4 mm or the value of the ratio of the smallest inner diameter P1 to the smallest outer diameter L1 (P1/L1) is less than 0.25, the possibility arises that the through hole is closed during the polymerization step, and the tubular thermoplastic resin composite bead may not be obtained. As a result, spaces may not be adequately formed in the foamed molded article formed from expanded thermoplastic resin composite beads. P1 is preferably not less than 0.5 mm, more preferably not less than 0.6 mm. The value of the ratio of P1 to L1 (P1/L1) is preferably not less than 0.30, more preferably not less than 0.50.

Where the value of P1/L1 of the tubular olefin resin seed bead is more than 0.85, the production of the bead itself becomes difficult. Where the value of P1/L1 is more than 0.85, even if the foamed molded article formed from expanded thermoplastic resin composite beads may be formed to be excellent in mutual fusion-bonding of the expanded beads, its rigidity may not be fully obtained. The value of P1/L1 is preferably not more than 0.80, more preferably not more than 0.70.

In order to allow the foamed molded article formed from expanded thermoplastic resin composite beads to have more enhanced rigidity, P1 is preferably not more than 1.0 mm, more preferably not more than 0.8 mm.

Where the height H of the olefin resin seed bead is less than 0.5 mm, the value of H/L1 of the bead becomes small. Due to this, the expanded thermoplastic resin composite bead obtained with the olefin resin seed bead may be disadvantageously flattened. As a result, there arises a tendency that the expanded thermoplastic resin composite beads are not effectively charged in a mold for molding. The height H is preferably not less than 1.0 mm, more preferably not less than 1.5 mm. On the other hand, where the height H is more than 5.0 mm, the production of the olefin resin seed bead itself may become difficult. The height H is preferably not more than 4.0 mm, more preferably not more than 3.0 mm.

Usually, the height H of the olefin resin seed bead is the length (height) of the bead in a direction generally parallel to a direction in which the through hole of the olefin resin seed bead extends.

The smallest outer diameter L1 of the olefin resin seed bead is preferably 0.5 to 3.0 mm, more preferably 0.8 to 1.5 mm. Where the bead diameter of the olefin resin seed bead is set to fall in these ranges, spaces are more readily obtained in a foamed molded article formed from expanded thermoplastic resin composite beads, which leads to further improvement of the properties like sound absorption properties. In addition, the expanded beads are further effectively charged in a mold for molding.

The tubular olefin resin seed bead having a smallest inner diameter P1, a smallest outer diameter L1, and a height H in the specified ranges as described above can be produced according to a conventionally known extrusion process for producing a tubular article, such as straw, in which an outlet provided to the dice of an extruder, which is for extruding olefin resins, is arranged to have a slit that has the same shape with the desired cross section of the olefin resin seed bead, for example.

Where the smallest inner diameter of the olefin resin seed bead after undergoing the heating treatment is defined as P$1_H$, and the smallest inner diameter of the olefin resin seed bead before undergoing the heating treatment is defined as P1, the one that falls in the range of 0.8 to 2.0 in the value of the ratio of P$1_H$ to P1 (P$1_H$/P1) is used as the olefin resin seed bead, wherein the heating treatment is performed by heating the olefin resin seed beads in water having a temperature of [Tm−25]° C. for 120 minutes, Tm(° C.) representing the melting point of the olefin resin seed bead. The heating treatment can be conducted in a pressure tight vessel such that the olefin resin seed beads are agitated in water having a temperature of [Tm−25]° C. for 120 minutes at a low speed so as not to cause mutual fusion of the beads.

Where the value of the ratio (P$1_H$/P1) is less than 0.8, the possibility arises that the through hole is closed during the polymerization step, and the tubular thermoplastic resin composite bead may not be obtained. The value of the ratio (P$1_H$/P1) is preferably not less than 0.9, more preferably not less than 1.0. On the other hand, where the value of the ratio (P$1_H$/P1) is more than 2.0, the rigidity of a foamed molded article formed from expanded thermoplastic resin composite beads may not be obtained enough even if the mutual fusion-bonding of the expanded beads is enough. The value of the ratio (P$1_H$/P1) is preferably not more than 1.7, more preferably not more than 1.5.

The tubular olefin resin seed bead is a bead having a through hole that passes the bead. The tubular olefin resin seed bead may be shaped into various forms such as a generally spherical form, a column-shaped form, and a prismatic form when viewed exteriorly as a whole. These may be applied for the tubular thermoplastic resin composite bead, the tubular expandable thermoplastic resin composite bead, and the tubular expanded thermoplastic resin composite bead, all of which will be described later.

In the dispersion step, the olefin resin seed beads are suspended in an aqueous medium, thereby obtaining a seed beads dispersing disperse system. The dispersion of the beads into the aqueous medium can be achieved by using a device equipped with an agitator. The aqueous medium is exemplified by water such as deionized water, for example. A well-known dispersant may be added to the aqueous medium in which the olefin resin seed beads are to be suspended.

Thereafter, in the polymerization step, styrene monomers are added to the disperse system, causing the olefin resin seed beads to be impregnated with the styrene monomers, and the resin beads impregnated with the styrene monomers are heated in the presence of a polymerization initiator. Thus, the styrene monomers are polymerized in the olefin resin seed beads, thereby obtaining thermoplastic resin composite beads. Where the olefin resin seed beads are impregnated with styrene monomers and polymerization is performed, the cross-link may be caused in addition to the polymerization. In this specification, there is a case that "polymerization" includes "cross-link."

As the polymerization initiator, such as the one which can be dissolved in a styrene monomer and which has a 10 hour half-life decomposition temperature of 50 to 120° C. can be used. Examples of the polymerization initiator include such as various organic peroxides and azo compounds. The organic peroxides are specifically exemplified by cumene hydroperoxide, dicumyl peroxide, t-butyl peroxy-2-ethylhexanonate, t-butyl peroxybenzoate, benzoyl peroxide, t-butyl peroxy isopropylcarbonate, t-amyl peroxy-2-ethylhexyl carbonate, hexyl peroxy-2-ethylhexyl carbonate, lauroyl peroxide, benzoyl peroxide, etc., for example. The azo compounds are exemplified by azobisisobutyronitrile, for example. These polymerization initiators may be used solely or in combination.

The polymerization initiator may be dissolved previously in the styrene monomer together, for example, with a cross linking agent, which is used if necessary. For example, 0.01 to 3 parts by mass of the polymerization initiator may be present per 100 parts by mass of the styrene monomer, depending on the type of the polymerization initiator.

A well-known plasticizer, an oil-soluble polymerization inhibitor, a flame retardant, a dye, etc., may be added to the styrene monomer, if necessary, besides the polymerization initiator and the cross linking agent.

A foam cell size adjusting agent may be added, if necessary, to the styrene monomer. As the foam cell size adjusting agent, such as a methyl methacrylate copolymer, polyethylene wax, aliphatic monoamide, and fatty acid bisamide may be used, for example. The amount of the foam cell size adjusting agent to be added is preferably 0.01 to 2 parts by mass per 100 parts by mass of the styrene monomer.

As the styrene monomer, the "styrene monomer" described above may be used. Further, the styrene monomer may be used in combination.

The amount of the styrene monomers to be added to the disperse system is controlled such that not less than 30 parts by mass and less than 90 parts by mass of the styrene monomer is present per 100 parts by mass in total of the olefin resin seed bead (by mass) and the styrene monomers added (by mass).

Where the amount of the styrene monomers to be added is less than 30 parts by mass, the strength property of the foamed molded article formed from expanded thermoplastic resin composite beads, which is obtained as a result of expanding the thermoplastic resin composite beads and molding thereof, may be degraded. On the other hand, where the amount of the styrene monomers to be added is not less than 90 parts by mass, the possibility arises that a through hole of the thermoplastic resin composite bead is closed as a result of polymerization. The amount of the styrene monomers to be added is preferably 50 to 80 parts by mass.

The polymerization in the polymerization step may be performed in the presence of a surfactant.

As the surfactant, a conventionally known anionic surfactant, a nonionic surfactant, a cationic surfactant or an amphoteric surfactant may be used, for example. One type or different types of surfactants selected from these may be used in combination. The anionic surfactant, such as sodium alkyl sulfonate, sodium alkylbenzene sulfonate, sodium lauryl sulfonate, sodium alpha olefin sulfonate, and sodium dodecyl diphenyl ether disulfonate is preferred. An alkali metal salt of alkyl sulfonate with 8 to 20 carbons is further preferred (sodium salt is more preferable). By using a surfactant, in the polymerization step, the olefin resin seed beads and the styrene monomers are steadily suspended in the disperse system.

In the polymerization step, it is preferred that a surfactant is contained in the aqueous medium in the amount of 30 to 1000 mass ppm.

Where the amount of the surfactant to be added is controlled to fall in this range, the suspension of the styrene monomers is performed with improved steadiness. Accordingly, the tubular thermoplastic resin composite bead with a through hole may be produced with improved steadiness. As a result, adequate spaces are formed with improved steadiness in a foamed molded article formed from expanded thermoplastic resin composite beads by expanding and molding the thermoplastic resin composite beads. The amount of the surfactant contained in the aqueous medium is preferably 100 to 750 mass ppm, more preferably 150 to 500 mass ppm.

As is well known, an electrolyte or a water-soluble polymerization inhibitor may be added to the aqueous medium besides the surfactant, if necessary.

The water-soluble polymerization inhibitor hardly permeates the olefin resin seed bead, and it will be dissolved in the aqueous medium. Therefore, in the polymerization step, the styrene monomers which have permeated the olefin resin seed beads are polymerized. In contrast, polymerization of the styrene monomers which are suspended in the aqueous medium without permeating into the olefin resin seed beads and which are in the vicinity of the surface of the olefin resin seed beads to be permeated the beads is prevented. Due to this, the thermoplastic resin composite bead may be formed such that the surface portion of the bead is smaller than its center portion in the amount of polystyrene. Therefore, where the thermoplastic resin composite beads are prepared by using the water-soluble polymerization inhibitor, and a foamed molded article formed from expanded thermoplastic resin composite beads is formed by foaming and molding the thermoplastic resin composite beads, the foamed molded article will be hardly broken or cracked and exhibit improved bending deflection and bending strength.

As the water-soluble polymerization inhibitor, sodium nitrite, potassium nitrite, ammonium nitrite, L-Ascorbic acid, citric acid, etc., may be used for example. The amount of the water-soluble polymerization inhibitor to be added is preferably 0.001 to 0.1 parts by mass, more preferably, 0.002 to 0.02 parts by mass per 100 parts by mass of the aqueous medium (any types of water like slurry containing reaction products).

Where a melting point of the olefin resin seed bead is represented by Tm(° C.), the maximum heat temperature in the polymerization step is set to fall in the range of [Tm−45] to [Tm−15] (° C.) in condition that the polymerization conversion rate of the styrene monomers is 0 to 80%.

Where the maximum heat temperature is more than [Tm−15] (° C.), the through hole is closed during polymerization, and the tubular thermoplastic resin composite bead may not be obtained. On the other hand, where the maximum heat temperature is less than [Tm−45] (° C.), it takes long time for polymerization, leading to disadvantages in production cost. Further, the diameter of the obtained thermoplastic resin composite beads may vary widely. The maximum heat temperature is preferably in the range of [Tm−35] to [Tm−15] (° C.).

The melting point of the olefin resin seed bead is a value determined by an endothermic peak temperature in a DSC curve which is obtained as a result of heating a 2 to 4 mg of olefin resin seed bead at a heating rate of 10° C./min using a 2010-type Differential Scanning Colorimeter (DSC) Instrument produced by TA Instruments Inc., for example, according to the "method of determining melting temperature after regulation of the sate of a test specimen" defined in JIS K7121-1987, heat-flux DSC.

The tubular thermoplastic resin composite bead preferably has a smallest inner diameter P2 of not less than 0.4 mm, and the value of the ratio (P2/L2) of the smallest inner diameter P2 (mm) to the smallest outer diameter L2 (mm) of 0.25 to 0.85.

With this arrangement, adequate spaces are more easily obtained in the foamed molded article formed from expanded thermoplastic resin composite beads which is obtained by using the thermoplastic resin composite beads. As a result, the foamed molded article formed from expanded thermoplastic resin composite beads may be formed to have a high porosity and exhibit improvement in the properties like the sound absorption property. P2 is preferably not less than 0.8 mm, more preferably not less than 1.0 mm, and the value of the ratio P2/L2 is preferably not less than 0.30, more preferably not less than 0.50. The value of the ratio P2/L2 is still more preferably not more than 0.80, yet more preferably not more than 0.70.

In view of obtaining a foamed molded article formed from expanded thermoplastic resin composite beads with improved rigidity, P2 is preferably not more than 2.0 mm, more preferably not more than 1.8 mm.

The smallest inner diameter P2 of the thermoplastic resin composite bead is unexpectedly apt to become larger than the smallest inner diameter P1 of the olefin resin seed bead. This may be primarily caused because distortion inherent to the olefin resin seed bead is reduced as a result of heating, etc., during polymerization and the smallest inner diameter of the olefin resin seed bead is increased.

The expandable thermoplastic resin composite bead, which is formed by impregnating the thermoplastic resin composite bead with a blowing agent, preferably has a smallest inner diameter P2 of not less than 0.4 mm, and the value of a ratio (P2/L2) of the smallest inner diameter P2 (mm) to the smallest outer diameter L2 (mm) of 0.25 to 0.85 with the same reasons of the thermoplastic resin composite bead.

The tubular thermoplastic resin composite bead is impregnated with a blowing agent, thereby obtaining the expandable thermoplastic resin composite bead. Thus obtained expandable thermoplastic resin composite bead is foamed and expanded, thereby obtaining an expanded thermoplastic resin composite bead.

To impregnate a blowing agent, a well-known technique is adopted in which, for example, thermoplastic resin composite beads are dispersed together with a physical blowing agent into a dispersing medium such as water in a pressure vessel such as an autoclave, then the resin beads are impregnated with the physical blowing agent by heating under agitation, thereby obtaining expandable thermoplastic resin composite beads.

As one of the ways for foaming the expandable thermoplastic resin composite beads, existing pre-expanding equipment, such as a batch-type pre-expander and a continuous-type pre-expander, both of which are for producing expanded polystyrene beads by expanding expandable polystyrene beads, may be used along with their production methods. Where expanded beads are produced by adopting the pre-expanding method, it is preferred that hydrocarbon compounds such as butane and pentane are used as a physical blowing agent in view of the retaining property of the blowing agent.

The expanded thermoplastic resin composite bead can be obtained also in a way described below. The thermoplastic resin composite beads are dispersed together with a physical blowing agent in a dispersing agent such as water in a pressure vessel. Then, the resin beads are softened and impregnated with the physical blowing agent by heating under agitation, thereby obtaining expandable thermoplastic resin composite beads. Thereafter, the expandable thermoplastic resin composite beads are released from the pressure vessel to a low pressure (usually, under atmospheric pressure) at a temperature not less than the temperature at which the expandable thermoplastic resin composite bead is melt, thereby foaming and expanding the expandable thermoplastic resin composite beads. As a result, expanded thermoplastic resin composite beads are obtained.

As the physical blowing agent, an inorganic physical blowing agent such as carbon dioxide, nitrogen, and atmospheric air is preferred although an organic physical blowing agent such as propane, butane, and pentane is usable. By using this type of blowing agent, the bulk density, the average diameter of foam cells, the smallest inner diameter, and the smallest outer diameter of the expanded thermoplastic resin composite bead are readily controlled in desired ranges.

The amount of the physical blowing agent to be used may be determined by considering the bulk density of the expanded thermoplastic resin composite bead, the type of a base resin, or the type of a blowing agent. It is preferred that 0.5 to 30 parts by mass of a blowing agent is used per 100 parts by mass of the thermoplastic resin composite bead.

If a foaming assistant that acts as a heterogeneous nuclear at the time of foaming is added to the olefin resin seed bead, the expansion ratio will be significantly increased. As the foaming assistant, such as zinc borate, borax, alum, and aluminum hydroxide are exemplified, for example. These foaming assistants may be added solely or in combination. Some of the foaming assistants are expected to act as a foam cell size adjusting agent, like zinc borate, for example.

The amount of the foaming assistant to be added is preferably not more than 25 parts by mass, more preferably not more than 15 parts by mass, still more preferably not more than 8 parts by mass, yet more preferably not more than 5 parts by mass, per 100 parts by mass of the olefin resin seed bead.

The bulk density of the expanded thermoplastic resin composite beads is preferably 10 to 500 kg/m$^3$.

With this arrangement, the closed-cell ratio of the expanded beads is maintained easily, and which will lead to enhancement of the mechanical strength, such as compression properties, of a foamed molded article formed from expanded thermoplastic resin composite beads which is obtained by molding the expanded thermoplastic resin composite beads. In addition, variations in size and dimensions of the foam cells of the expanded beads are reduced further. As a result, variations in bulk density of the foamed molded article formed from expanded thermoplastic resin composite beads are reduced further. It is preferred that the expanded thermoplastic resin composite beads have a bulk density of 13 to 200 kg/m$^3$.

The bulk density (kg/m$^3$) of the expanded thermoplastic resin composite beads may be controlled by adjusting, for example, the ratio of composite resins, foaming conditions (temperature and pressure), and the amount of a blowing agent. The bulk density of the expanded thermoplastic resin composite beads can be measured as follows.

A 1 L measuring cylinder is filled with the expanded thermoplastic resin composite beads to a 1 L-marked line. Then, the weight of the expanded thermoplastic resin composite beads per 1 L is measured, and unit conversions are performed, to thereby obtain the bulk density (kg/m$^3$).

The average diameter of foam cells of the expanded thermoplastic resin composite beads is preferably 50 to 500 µm.

With this arrangement, the foam cell wall constituting a foam cell becomes large enough in thickness, so that a possibility that a styrene resin is exposed on the surface of the foam cell wall may be reduced further. If the styrene resin is exposed on the surface of the foam cell wall, foam cells are susceptible to rupture by heating during in-mold molding. This tendency significantly increases where the expansion ratio of the expanded beads is high.

In addition, with this arrangement, the mechanical strength, such as compression properties, of a foamed molded article formed from expanded thermoplastic resin composite beads which is obtained by molding the expanded thermoplastic resin composite beads is improved. The average diameter of foam cells of the expanded thermoplastic resin composite beads is preferably 80 to 300 μm.

The average diameter of foam cells of the expanded thermoplastic resin composite beads may be controlled by adjusting generally, for example, a foaming temperature, the pressure under which a blowing agent is impregnated, the number of voids present in a styrene resin, the amount of a foaming assistant dispersed in seed beads, and the type and the amount of a foam cell size adjusting agent.

The average diameter of foam cells of the expanded thermoplastic resin composite beads can be measured as follows.

The expanded thermoplastic resin composite bead is cut into two parts so as to obtain a cutting surface in a direction orthogonal to a direction in which the through hole extends, and an enlarged photograph of the cutting surface is taken. Then, a line extending from one side surface of the expanded bead to the other side is drawn on the picture so as to pass the vicinity of the center of the through hole. The number of the foam cells locating on the line is counted, and the foam cell diameter per foam cell is calculated by dividing the total length (not the length on the photograph, but an actual length) of a portion of the line on which the foam cells are crossing the line by the counted number of the foam cells. Thus calculated value is defined as the foam cell diameter (μm) of each expanded bead. These steps are repeated for 50 expanded beads, and the averaged measurement value is defined as the average diameter of foam cells (μm).

The tubular expanded thermoplastic resin composite bead has preferably a smallest inner diameter P3 of not less than 1.5 mm, and the value of the ratio (P3/L3) of the smallest inner diameter P3 (mm) to the smallest outer diameter L3 (mm) of 0.25 to 0.85.

With this arrangement, adequate spaces are more readily obtained in the foamed molded article formed from expanded thermoplastic resin composite beads which is obtained by molding the expanded thermoplastic resin composite beads. Accordingly, the foamed molded article formed from expanded thermoplastic resin composite beads obtain a higher porosity and characteristic shock absorbing properties and exhibits improvement in properties like sound absorption properties and permeability.

P3 is preferably not less than 2.0 mm, more preferably not less than 2.5 mm. P3/L3 is preferably not less than 0.30, more preferably not less than 0.50. Still more preferably, P3/L3 is not more than 0.80, yet more preferably not more than 0.70.

In view of obtaining a foamed molded article formed from expanded thermoplastic resin composite beads with a higher rigidity, P3 is preferably not more than 8.0 mm, more preferably not more than 7.0 mm.

As a result of molding the expanded thermoplastic resin composite beads, a foamed molded article formed from expanded thermoplastic resin composite beads is obtained. Specifically, the expanded thermoplastic resin composite beads are charged into a mold, and then the expanded beads are mutually fusion-bonded by supplying, for example, a heating medium such as saturated steam, superheated steam, hot water, and heated air into the mold, thereby obtaining the foamed molded article formed from expanded thermoplastic resin composite beads.

As to the foamed molded article formed from expanded thermoplastic resin composite beads, it is preferred that the bulk density is 10 to 500 kg/m$^3$, the porosity is 10 to 600, and the degree of fusion-bonding among the expanded beads is not less than 60%.

With this arrangement, the foamed molded article formed from expanded thermoplastic resin composite beads exhibits improvement in mechanical strength in addition to heat insulating properties, shock absorbing properties, sound absorption properties, permeability to water, permeability to air and light-weight properties. Accordingly, the foamed molded article formed from expanded thermoplastic resin composite beads is more suitably used as a packaging material, a construction material, a shock absorbing material for vehicles, etc. Specially, it may be suitably used, for example, as interior materials for vehicles such as tibia pads and floor spacers, and sound absorbers such as for soundproof walls of a highway. The bulk density of the foamed molded article is more preferably 13 to 200 kg/m$^3$. The porosity of the foamed molded article is more preferably not less than 18%, still more preferably not less than 25%. The porosity of the foamed molded article is preferably not more than about 50%.

The degree of fusion-bonding of the foamed molded article formed from expanded thermoplastic resin composite beads is not necessarily correlated with the mechanical strength property of the article. In many cases, the mechanical strength property is improved in the case where the degree of fusion-bonding is below 100% than the case where the degree of fusion-bonding is 100%. Therefore, the degree of fusion-bonding does not necessarily be 100%. The degree of fusion-bonding of the foamed molded article formed from expanded thermoplastic resin composite beads is preferably 65 to 100%, more preferably 70 to 95%.

The bulk density of the foamed molded article formed from expanded thermoplastic resin composite beads can be measured as follows.

That is, a sample is cut out in the shape of a rectangular solid with an outer dimension of 20×20×100 mm from the foamed molded article formed from expanded thermoplastic resin composite beads that is left for 24 hours or more at a temperature of 23° C. and a relative humidity of 50%. The bulk volume of the sample (20×20×100 (mm$^3$)) is calculated on its outer dimension. Then, the weight of the sample (g) is accurately measured. The weight of the sample is divided by the bulk volume of the sample, and then unit conversions are performed, so that the bulk density of the foamed molded article (kg/m$^3$) can be measured.

The porosity of the foamed molded article formed from expanded thermoplastic resin composite beads can be measured in a way described below.

That is, a sample is cut out in the shape of a rectangular solid with proper volume from the foamed molded article formed from expanded thermoplastic resin composite beads that is left for 24 hours or more at a temperature of 23° C. and a relative humidity of 50%. The bulk volume of the sample is calculated on its outer dimension. Then, the rectangular solid sample is sank, by using a tool like metal meshes, for example, into a 500 mL graduated cylinder made of glass in which 200 mL ethanol is contained at a temperature of 23° C. Then, light vibration is applied to remove the air existing in the spaces of the foamed molded article. Thereafter, the true volume (cm$^3$) of the rectangular solid sample is calculated through the raising of water level excepting the volume of the tool like metal meshes in the ethanol. The porosity (%) can be obtained on the calculated bulk volume (cm³) and the true volume (cm³) of the sample according to the following formula.

The porosity (%)=((the bulk volume of the sample (cm³)−the true volume of the sample (cm³))/the bulk volume of the sample (cm³))×100

"Continuous bore spaces" in the foamed molded article include both space of through holes of expanded beads constituting the foamed molded article and space of voids formed between the expanded beads.

To measure the degree of fusion-bonding of the foamed molded article formed from expanded thermoplastic resin composite beads, the foamed molded article is fractured to obtain a cross section (the cross section on which 100 or more expanded beads are present) for observation. Then, the number of the expanded beads which are fractured in their inner portions, and the number of the expanded beads which peeled off in their boundary faces are visually counted, respectively. And the ratio (%), in number, of the expanded beads which are fractured in their inner portions to the total, in number, of the expanded beads which are fractured in their inner portions, and the expanded beads which peeled off in their boundary faces is calculated. This calculated value is defined as the degree of fusion-bonding.

EMBODIMENTS

Hereunder, there will be described preferred embodiments and comparative examples for producing a thermoplastic resin composite bead, an expanded thermoplastic resin composite bead obtained with the thermoplastic resin composite bead, and a foamed molded article formed from expanded thermoplastic resin composite beads that is obtained by molding the expanded thermoplastic resin composite beads.

In the production method according to the preferred embodiments, a tubular expanded thermoplastic resin composite bead is produced by performing a dispersion step and a polymerization step.

In the dispersion step according to the preferred embodiments of the present invention, there was used as an olefin resin seed bead 1 the one that is formed to have a tubular shape with a through hole and that is 0.5≤H≤5, P1≥0.4, and 0.25≤P1/L1≤0.85, where H (mm) is the height, P1 (mm) is the smallest inner diameter, and L1 (mm) is the smallest outer diameter of the bead 1, as illustrated in FIG. 1. Further, as to the olefin resin seed bead 1, confirmation was made before its adoption whether the value of the ratio of the smallest inner diameter $P1_H$ of the olefin resin seed bead 1 after undergoing the heating treatment to the smallest inner diameter P1 of the olefin resin seed bead 1 before undergoing the heating treatment ($P1_H$/P1) falls within a range of 0.8 to 2.0. The heating treatment was performed such that the olefin resin seed beads were agitated in a way not to cause melting and fusing of the beads at a low speed for 120 minutes in a pressure tight vessel having water of [Tm−25]° C. wherein Tm(° C.) represents a melting point of the olefin resin seed bead 1.

Further, the amounts of the styrene monomers, and the olefin resin seed beads to be added were respectively controlled to satisfy 30≤C/(C+D)×100<90, where represents the amount of the styrene monomers to be added (parts by mass), and D represents the amount of the olefin resin seed beads in the disperse system (parts by mass).

In the polymerization step, polymerization is performed on condition that the maximum heat temperature (polymerization temperature) A(° C.) is in the range of [Tm−45] to [Tm−15]° C., namely Tm−A=15 to 45(° C.), provided that the polymerization conversion rate of the styrene monomers is 0 to 80%.

Hereunder, the production methods according to the preferred embodiments of the present invention and comparative examples will be described in detail.

Embodiment 1

(1) Production of Olefin Resin Seed Beads (Seed Beads)

Into a Henschel mixer (FM-75E type, produced by Mitsui Miike Machinery Co., Ltd.), 5 kg of an ethylene-vinyl acetate copolymer ("Ultrathene 626" produced by Tosoh Corporation) in which vinyl acetate is contained in 15 mass %, 15 kg of a linear low density polyethylene resin ("Nipolon 9P51A" produced by Tosoh Corporation) and 0.144 kg of zinc borate as a foaming assistant were fed and they were mixed for 5 minutes.

Then, the resin compounds were melt-kneaded in an extruder (IKG corporation's MS50-28 type, 50 mmϕ) single screw extruder, Maddock type screw) at a temperature of 230 to 250° C. Then, the kneaded materials were extruded in a strand state through a die with a die-lip of a similar shape with the tubular shape, as illustrated in FIG. 1. And, they were cut such that the weight of each bead is 0.8 to 1.2 mg (the average is 1.0 mg/per bead), and the value of H (height)/L1 (the smallest outer diameter) is 2. In this manner, the tubular olefin resin seed bead 1 (seed bead) with a through hole was obtained (see FIG. 1).

The dimensions, the smallest inner diameter P1 (mm), the smallest outer diameter L1 (mm), the value of P1/L1, the height H (mm), and the melting point Tm(° C.) of the olefin resin seed bead 1 according to the present embodiment are listed in Table 1, shown later.

The smallest inner diameter P1, the smallest outer diameter L1, and the height H were measured in a way described below.

To measure target dimensions of the olefin resin seed bead, a target cross-sectional view suitable for measuring a target dimension of a seed bead was photographed by using a KEYENCE CORPORATION'S microscope VHX-100F (Lens: VH-Z25, a magnification of 100 times). Photos were taken for not less than 20 olefin resin seed beads, and 15 cross-sectional photos were randomly selected from these. The average value of the target dimension was obtained on the values measured from the 15 photos. The averaged value was determined as the smallest inner diameter P1, the smallest outer diameter L1, and the height H, respectively.

The melting point Tm was measured, as described above, according to the "method of determining melting temperature after regulation of the state of a test specimen" defined in JIS K7121-1987, heat flux, DSC, using a TA Instrument's 2010 type Differential Scanning Colorimeter.

The heating treatment was performed in which the olefin resin seed beads, obtained in a way described above, are heated in water having a temperature of [Tm−25]° C. for 120 minutes. Then, the smallest inner diameter $P1_H$ of the olefin resin seed bead after undergoing the heating treatment, and the value of the ratio of the smallest inner diameter $P1_H$ after undergoing the heating treatment to the smallest inner diameter P1 before undergoing the heating treatment ($P1_H$/P1) were confirmed. The smallest inner diameter $P1_H$ was measured in the same way for measuring the P1 as described above. The value of $P1_H$/P1 is listed in table 1, shown later.

(2) Production of Thermoplastic Resin Composite Beads 1000 g deionized water was fed into an autoclave having an internal volume of 3 L with an agitator, and 6.7 g of sodium pyrophosphate was added and dissolved therein. After 14.6 g of powdered magnesium nitrate hexahydrate was added, agitation was performed for 30 minutes at a room temperature, thereby obtaining a magnesium pryophosphate slurry as a dispersing agent.

After obtaining the magnesium pyrophosphate slurry, 3.0 g of sodium lauryl sulfonate (10 mass % aqueous solution) as the surfactant, 5.0 g of sodium nitrite as the water-soluble polymerization inhibitor, and 150 g of the olefin resin seed beads, obtained in a way as described above, were dispersed in the slurry.

In the styrene monomers composed of 335 g of styrene and 15 g of butyl acrylate, there were dissolved 1.675 g of benzoyl peroxide (Nihon Yushi Kabushiki Kaisha's "NYPER BW," powder diluted with water) and 0.25 g of t-butyl peroxy-2-ethylhexylmonocarbonate (Nihon Yushi Kabushiki Kaisha's "PERBUTYL E") as the polymerization initiators, and 4.25 g of 1,1-Di(tert-butylperoxy)cyclohexane ("LUPEROX 331M70" produced by ARKEMA Yoshitomi, Ltd.) as a cross linking agent, and they were fed into an autoclave under agitation at a rotation speed of 500 rpm.

After the gas phase portion of the autoclave was replaced with nitrogen gas, the temperature therein was raised to 80° C. by taking one and a half hours. After the temperature was kept at 80° C. for 30 minutes, the agitation speed was lowered to 450 rpm, and the temperature was kept at 80° C. for 5 hours. It was confirmed that this 5-hour heating at 80° C. would allow the polymerization conversion rate to become about 90%. Thereafter, it was heated to 120° C. by taking two hours, and the temperature was kept at 120° C. for 5 hours. Thereafter, it was cooled to 30° C. by taking six hours. After cooling, the contents of the autoclave were taken out. By adding nitric acid, magnesium pyrophosphate attached on the surfaces of the tubular thermoplastic resin composite beads was dissolved. Then, cleaning was performed by using a centrifuge, and water on the surface of the beads was removed by using a flash dryer. In this way, the tubular thermoplastic resin composite beads were obtained.

The polymerization conversion rate could be measured, such that a 1 g sample of the thermoplastic resin composite bead was measured, that the sample was dissolved in 25 ml dimethylformamide, and that the volume of the remaining styrene monomers was measured according to the Gas Chromatography, thereby obtaining the ratio (%) of the remaining styrene monomers. The polymerization conversion rate was calculated according to the formula:

The polymerization conversion rate (%)=100(%)−remaining styrene monomers (%).

The specific measuring condition according to the Gas Chromatography was specified as follows:
Device: Shimadzu Corporation's Gas Chromatograph GC-9A,
Column packings: [liquid phase] PEG-20M, [rate of liquid impregnation] 25 weight %, [mesh] 60/80 meshes
Material of column: glass column with an inner diameter of 3 mm, and a length of 3000 mm
Carrier gas: N2
Detector: FID (Flame Ionization Detector)
Fixed quantity: Internal standard method As to the thermoplastic resin composite beads obtained in a way described above, there are listed its production conditions in Table 1 shown later, such as the amount of the styrene monomers (parts by mass); the amount of the olefin resin seed beads (parts by mass); the maximum heat temperature (polymerization temperature) A° C. in condition that the polymerization conversion rate is in the range of 0 to 80%; the melting point-polymerization temperature (Tm−A)(° C.); the amount of the surfactant (mass ppm); dimensions of a bead; the smallest inner diameter P2 (mm); the smallest outer diameter L2 (mm); and the value of P2/L2. The smallest inner diameter P2 and the smallest outer diameter L2 were measured in the same way for measuring the smallest inner diameter P1 and the smallest outer diameter L1 of the olefin resin seed bead (seed bead), described above.

(3) Production of Tubular Expanded Thermoplastic Resin Composite Beads

Into a 5 L autoclave with an agitator, 500 g of tubular thermoplastic resin composite bead, prepared as described above, was fed together with 3.5 L of water as a dispersing medium. Into the dispersing medium, 5 g of kaolin as a dispersant and 0.5 g of sodium alkylbenzene sulfonate as a surfactant were further added. Then, agitation was performed at a rotation speed of 300 rpm until a foaming temperature reaches 155° C., and carbon dioxide as a blowing agent was pressed into the autoclave in a way allow the inner pressure of the autoclave to become 4.0 MPa (G: Gauge pressure). The temperature was kept at 155° C. for 15 minutes. Thereafter, the contents of the autoclave were released under atmospheric pressure, so that the expandable thermoplastic resin composite beads were foamed and expanded, obtaining the tubular expanded thermoplastic resin composite beads with a bulk density of 30 kg/m$^3$.

As to the expanded thermoplastic resin composite beads obtained in a way described above, there are listed its production conditions in table 1 shown later, such as the foaming temperature (° C.), the type of the blowing agent, the inner pressure of the autoclave (MPa (G)), dimensions of an expanded bead, the smallest inner diameter P3 (mm), the smallest outer diameter L3 (mm), the value of P3/L3, the bulk density (kg/m$^3$), and the average diameter of foam cells (μm). The smallest inner diameter P3 and the smallest outer diameter L3 were measured in the same way for measuring the smallest inner diameter P1 and the smallest outer diameter L1 of the olefin resin seed beads. The bulk density and the average diameter of foam cells of the expanded thermoplastic resin composite beads were each measured in a way described above.

(4) Production of a Foamed Molded Article Formed from Expanded Thermoplastic Resin Composite Beads The expanded thermoplastic resin composite beads were aged for one day at 23° C. The expanded thermoplastic resin composite beads were shaped using a molding machine (VS500 produced by DAISEN Co., Ltd.) by heating under a steam source pressure for molding of 0.10 MPa (G) for 20 seconds, so that a foamed molded article (the foamed molded article formed from expanded thermoplastic resin composite beads) with dimensions of 250 mm in length, 200 mm in width, and mm in thickness was obtained. Thus obtained foamed molded article formed from expanded thermoplastic resin composite beads was subjected to curing for one day at 60° C., and evaluation was conducted in connection with the degree of fusion-bonding, the bulk density, the porosity, the sound absorption properties, and the bending strength.

Figure 4:
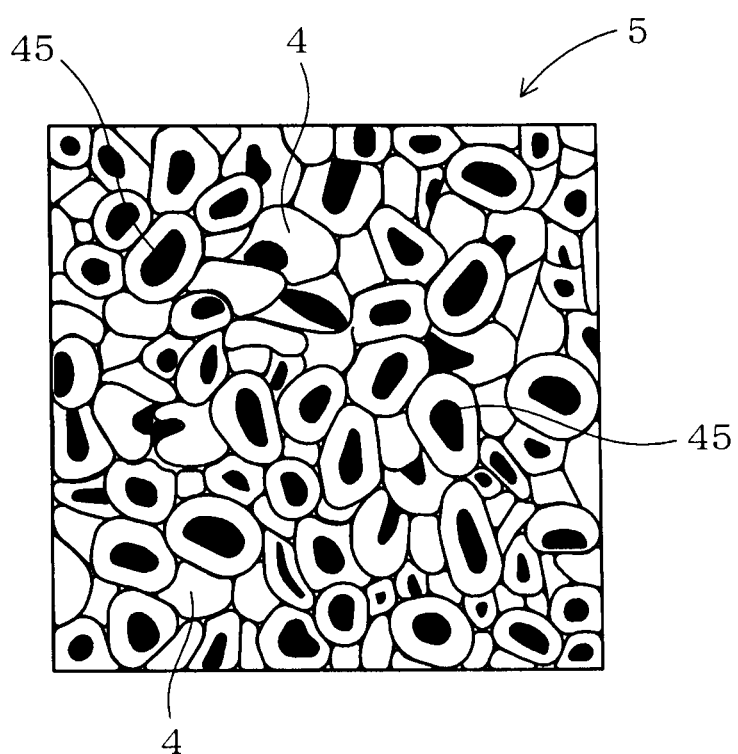
FIG. 4 is a view illustrating the surface of a foamed molded article formed from expanded thermoplastic resin composite beads according to an embodiment.

The surface of the foamed molded article formed from expanded thermoplastic resin composite beads according to the present embodiment is exemplary illustrated in FIG. 4. As illustrated in FIG. 4, a foamed molded article formed from expanded thermoplastic resin composite beads 5 according to the present embodiment is obtained by mutually melting and bonding a plurality of the tubular expanded thermoplastic resin composite beads 4. In the foamed molded article 5, the expanded beads 4 constituting the foamed molded article 5 have a communicating hole 45 (a through hole) therein, so that spaces are formed in the entire foamed molded article 5.

(Degree of Fusion-Bonding, Bulk Density, and Porosity)

The degree of fusion-bonding, the bulk density, and the porosity of the foamed molded article formed from expanded thermoplastic resin composite beads were measured, respectively in a way as described above. The results are listed in table 1 shown later.

(Sound Absorption Property)

The normal incident sound absorption coefficient was measured according to JIS A 1405-1 (2007).

Specifically, a disk shape piece was cut out from the foamed molded article formed from expanded thermoplastic resin composite beads so as to have a diameter of 90 mm and a thickness of 50 mm, as a sample. The sound absorbing rate was measured by TYPE 10041A produced by Sotec Co., Ltd., in a rage of frequencies from 200 to 2000 Hz. The center frequency was measured for ten frequencies, namely, 200, 315, 400, 500, 630, 800, 1000, 1250, 1600, and 2000 Hz. As to the ten measured center frequencies, the evaluation was made such that where not less than 5 frequencies had the sound absorbing rate of not less than 30%, the evaluation was identified as "excellent," where not less than 3 and not more than 4 frequencies had the sound absorbing rate of not less than 30%, the evaluation was identified as "good," and where not more than 2 frequencies had the sound absorbing rate of not less than 30%, the evaluation was identified as "poor." The results are listed in table 1 shown later.

The measurement was made as to the bending strength of the foamed molded article formed from expanded thermoplastic resin composite beads which was obtained by molding the expanded thermoplastic resin composite beads under the below described condition.

(Bending Strength)

The three-point bending test was performed to measure the bending strength (MPa) according to JIS K 7221-2 (2006).

Specifically, the expanded thermoplastic resin composite beads, obtained as described above, were aged at 23° C. for one day. Then, the expanded thermoplastic resin composite beads were shaped using a molding machine (VS500 produced by DAISEN Co., Ltd.) equipped with a mold having dimensions of 300×75×25 mm by heating under a steam pressure for molding of 0.10 MPa (G) for 20 seconds. Then, the three-point bending test (200 mm span, 100 mm/min test speed) of the foamed molded article (foamed molded article formed from expanded thermoplastic resin composite beads) was performed to measure the maximum bending strength (MPa). The same test was conducted for five foamed molded articles, and an average value was obtained from the results, thereby identifying the maximum bending strength (MPa). The results are listed in table 1 shown later.

Embodiment 2

In this embodiment, tubular olefin resin seed beads were initially prepared similarly with the Embodiment 1.

To produce thermoplastic resin composite beads, 75 g of olefin resin seed bead, and 410 g of styrene and 15 g of butyl acrylate both as the styrene monomer, were used. Except for this, the tubular thermoplastic resin composite beads were produced similarly with the Embodiment 1.

Thereafter, expanded thermoplastic resin composite beads were produced by foaming and expanding the thermoplastic resin composite beads, similarly with the Embodiment 1, except that a foaming temperature was changed to 160° C.

Similarly with the Embodiment 1, the obtained expanded thermoplastic resin composite beads were molded in a mold, thereby obtaining a foamed molded article formed from expanded thermoplastic resin composite beads.

Embodiment 3

In this embodiment, tubular olefin resin seed beads were initially prepared similarly with the Embodiment 1. Then, tubular thermoplastic resin composite beads were produced, similarly with the Embodiment 1, except that 250 g of olefin resin seed bead, and 235 g of styrene and 15 g of butyl acrylate both as the styrene monomer, were used.

Then, carbon dioxide was pressed into an autoclave in a way allow the inner pressure of the autoclave to become 3.8 MPa (G). Except for this, similarly with the Embodiment 1, the thermoplastic resin composite beads were expanded, thereby obtaining expanded thermoplastic resin composite beads.

Similarly with the Embodiment 1, the obtained expanded thermoplastic resin composite beads were molded in a mold, thereby obtaining a foamed molded article formed from expanded thermoplastic resin composite beads.

Embodiment 4

In this embodiment, similarly with the Embodiment 1, tubular olefin resin seed beads were prepared so as to have a smallest inner diameter P1 of 0.53 (mm), a smallest outer diameter L1 of 1.2 (mm), the value of P1/L1 of 0.44, and a height of 2.5 (mm), except that the conditions under which extrusion process is performed was changed.

Then, tubular thermoplastic resin composite beads were produced similarly with the Embodiment 1, except that the olefin resin seed beads, prepared in a way described above, were used.

Expanded thermoplastic resin composite beads were produced by foaming and expanding the thermoplastic resin composite beads, similarly with the Embodiment 1, except that carbon dioxide was pressed into an autoclave in a way allowing the inner pressure of the autoclave to become 4.2 MPa (G).

Similarly with the Embodiment 1, the obtained expanded thermoplastic resin composite beads were molded in a mold, thereby obtaining a foamed molded article formed from expanded thermoplastic resin composite beads.

Embodiment 5

In this embodiment, tubular olefin resin seed beads were initially prepared similarly with the Embodiment 1.

Then, similarly with the Embodiment 1, a magnesium pyrophosphate slurry, a surfactant, a water-soluble polymerization inhibitor, and olefin resin seed beads were fed into an autoclave. Thereafter, styrene monomers, in which a polymerization initiator and a cross linking agent are dissolved, were additionally fed into the autoclave while being agitated at a rotation speed of 500 rpm.

After the gas phase portion of the autoclave was replaced with nitrogen gas, the temperature was raised to 84° C. by taking one and a half hours. After the temperature was kept at 84° C. for 30 minutes, the agitation speed was lowered to 450 rpm, and the temperature was cooled to 80° C. by taking 30 minutes. After cooling to 80° C., the temperature was kept at 80° C. for 5 hours. It was confirmed that this 5-hour heating at 80° C. would allow the polymerization conversion rate to become about 90%. Further, the temperature was raised to 120° C. by taking two hours, and then the temperature was kept at 120° C. for 5 hours. Thereafter, the temperature was cooled to 30° C. by taking about six hours.

After cooling, the contents of the autoclave were taken out. Similarly with the Embodiment 1, magnesium pyrophosphate attached on the surface of the beads was dissolved, and drying and cleaning were performed using a centrifuge. In this way, tubular thermoplastic resin composite beads were obtained.

Then, expanded thermoplastic resin composite beads were produced by foaming and expanding the thermoplastic resin composite beads, similarly with the Embodiment 1, except that carbon dioxide was pressed into the autoclave in a way allowing the inner pressure of the autoclave to become 4.5 MPa (G).

Similarly with the Embodiment 1, the obtained expanded thermoplastic resin composite beads were molded in a mold, thereby obtaining a foamed molded article formed from expanded thermoplastic resin composite beads.

Embodiment 6

In this embodiment, tubular olefin resin seed beads were initially prepared similarly with the Embodiment 1.

Then, similarly with the Embodiment 1, a magnesium pyrophosphate slurry, a surfactant, a water-soluble polymerization inhibitor, and olefin resin seed beads were fed into an autoclave. Thereafter, styrene monomers in which a polymerization initiator and a cross linking agent are dissolved were additionally fed into the autoclave while being agitated at a rotation speed of 500 rpm.

After the gas phase of the autoclave was replaced with nitrogen gas, the temperature was raised to 65° C. by taking one and a half hours. After the temperature was kept at 65° C. for 30 minutes, the agitation speed was lowered to 450 rpm, and the temperature was kept at 65° C. for 22 hours. It was confirmed that this 22-hour heating at 65° C. would allow the polymerization conversion rate to become about 90%. Further, the temperature was raised to 120° C. by taking two hours, and then the temperature was kept at 120° C. for 5 hours. Thereafter, the temperature was cooled to 30° C. by taking about six hours.

After cooling, the contents of the autoclave were taken out. Similarly with the Embodiment 1, magnesium pyrophosphate attached on the surface of the beads was dissolved, and cleaning and drying were performed using a centrifuge. In this way, tubular thermoplastic resin composite beads were obtained.

Then, expanded thermoplastic resin composite beads and a foamed molded article formed from expanded thermoplastic resin composite beads were obtained, similarly with the Embodiment 1, by using the thermoplastic resin composite beads obtained in the present embodiment.

Embodiment 7

In this embodiment, tubular olefin resin seed beads were initially prepared similarly with the Embodiment 1.

Then, with the olefin resin seed beads, tubular thermoplastic resin composite beads were obtained, similarly with the Embodiment 1, except that 5.0 g of sodium lauryl sulfonate (10 mass % aqueous solution) was used as a surfactant.

Thereafter, expanded thermoplastic resin composite beads and a foamed molded article formed from expanded thermoplastic resin composite beads were obtained, similarly with the Embodiment 1, by using the thermoplastic resin composite beads obtained in the present embodiment.

Embodiment 8

In the present embodiment, tubular olefin resin seed beads were prepared similarly with the Embodiment 1, except that 5 kg of an ethylene-vinyl acetate copolymer ("Ultrathene 626" produced by Tosoh Corporation) containing mass % vinyl acetate, 15 kg of a linear low density polyethylene resin ("Nipolon 9P51A" produced by Tosoh Corporation), 0.144 kg of zinc borate, as a foaming assistant, and 2.7 kg of Black SPEMD-8A1615HCAL-K (master batch containing 40 mass % furnace black) produced by SUMIKA COLOR Co., Ltd., as furnace black, were fed into a Henschel mixer. Except for this, tubular olefin resin seed beads were prepared similarly with the Embodiment 1.

Then, tubular thermoplastic resin composite beads were obtained similarly with the Embodiment 1 using the olefin resin seed beads prepared in the present embodiment.

Thereafter, expanded thermoplastic resin composite beads and a foamed molded article formed from expanded thermoplastic resin composite beads were obtained, similarly with the Embodiment 1, by using the thermoplastic resin composite beads obtained in the present embodiment.

Embodiment 9

In this embodiment, tubular olefin resin seed beads were initially prepared similarly with the Embodiment 1, and tubular thermoplastic resin composite beads were produced with the obtained seed beads.

Then, similarly with the Embodiment 1, thus obtained thermoplastic resin composite beads were foamed and expanded to obtain expanded thermoplastic resin composite beads (primary expanded beads). Thus obtained primary expanded beads were dried. Then, steam was applied to the primary expanded beads in a secondary-expanding equipment so as to allow the inner pressure of the equipment to become about 0.26 MPa (G), and then steam was further applied under pressure of about 0.04 MPa (G) for 15 seconds, thus performing a second stage expansion. In this manner, tubular expanded thermoplastic resin composite beads (secondary expanded beads) with a bulk density of about 9 kg/m$^3$ were obtained.

Then, expanded thermoplastic resin composite beads and a foamed molded article formed from expanded thermoplastic resin composite beads were obtained, similarly with the Embodiment 1, by using the thermoplastic resin composite beads obtained in the present embodiment.

Embodiment 10

In this embodiment, tubular olefin resin seed beads were initially prepared similarly with the Embodiment 1.

Then, similarly with the Embodiment 1, a magnesium pyrophosphate slurry, a surfactant, a water-soluble polymerization inhibitor, and olefin resin seed beads were fed into an autoclave. Thereafter, styrene monomers in which a polymerization initiator and a cross linking agent are dissolved were additionally fed into the autoclave while being agitated at a rotation speed of 500 rpm.

Further, similarly with the Embodiment 1, after the gas phase portion of the autoclave was replaced with nitrogen gas, the temperature was raised to 80° C. by taking one and a half hours. After the temperature was kept at 80° C. for 30 minutes, the agitation speed was lowered to 450 rpm, and the temperature was kept at 80° C. for 5 hours. It was confirmed that this 5-hour heating at 80° C. would allow the polymerization conversion rate to become about 90%. Further, the temperature was raised to 120° C. by taking two hours, and the temperature was kept at 120° C. for 5 hours.

Then, the temperature was cooled to 90° C. by taking one hour, the agitation speed was lowered to 400 rpm, and 20 g of cyclohexane and 50 g of butane (a mixture of about 20 mass % normal butane and about 80 mass % isobutene), both are as a blowing agent, were added into the autoclave by taking about 30 minutes. Then, the temperature was kept at 90° C. for 3 hours. Then the temperature was raised to 105° C. by taking two hours. After the temperature was kept at 105° C. for 5 hours, it was cooled to 30° C. by taking about six hours.

After cooling, the contents of the autoclave were taken out. Similarly with the Embodiment 1, magnesium pyrophosphate attached on the surface of the beads was dissolved, and cleaning and drying were performed using a centrifuge. In this way, tubular thermoplastic resin composite beads were obtained. The tubular thermoplastic resin composite beads in the present embodiment are expandable thermoplastic resin composite beads which have been impregnated with a blowing agent.

The expandable thermoplastic resin composite beads obtained in the present embodiment were fed into a 30 L atmospheric pressure batch-type expander, and foamed and expanded to attain a bulk density of 30 kg/m³ by supplying steam into the expander. In this manner, tubular expanded thermoplastic resin composite beads were obtained.

Similarly with the Embodiment 1, the obtained expanded thermoplastic resin composite beads were molded in a mold, thereby obtaining a foamed molded article formed from expanded thermoplastic resin composite beads.

Embodiment 11

In this embodiment, tubular olefin resin seed beads were initially prepared similarly with the Embodiment 1, and tubular thermoplastic resin composite beads were produced with the obtained seed beads similarly with the Embodiment 1.

Then, expanded thermoplastic resin composite beads were obtained, similarly with the Embodiment 1, by using the thermoplastic resin composite beads.

Thereafter, the expanded thermoplastic resin composite beads were aged at 23° C. for one day and molded using a molding machine (VS500) by heating under a steam pressure for molding of 0.10 MPa (G) for 14 hours, thereby obtaining a foamed molded article with dimensions of 250 mm in length, 200 mm in width, and 50 mm in thickness. In this manner, a foamed molded article formed from expanded thermoplastic resin composite beads was obtained.

Comparative Example 1

In this example, similarly with the Embodiment 1, an ethylene-vinyl acetate copolymer, a linear low density polyethylene, and a foaming assistant were fed into a Henschel mixer and they were mixed for 5 minutes. Then, similarly with the Embodiment 1, the resin compounds were melt-kneaded in an extruder (IKG Corporation's MS50-28 type, 50 mmφ single screw extruder, Maddock type screw) at a temperature of 230 to 250° C. Then, the kneaded materials were cut in water into the shape of 0.4 to 0.6 mg/per bead (0.5 mg/per bead, in average). As a result, olefin resin seed beads having no hole and having a substantially spherical shape were obtained.

Then, thermoplastic resin composite beads were produced similarly with the Embodiment 1, except that the olefin resin seed beads, prepared in a way described above, were used. In the present example, spherical thermoplastic resin composite beads were obtained.

Thereafter, expanded thermoplastic resin composite beads were produced by foaming and expanding the thermoplastic resin composite beads, similarly with the Embodiment 1, except that a foaming temperature was changed to 165° C.

Similarly with the Embodiment 1, the obtained expanded thermoplastic resin composite beads were molded in a mold, thereby obtaining a foamed molded article formed from expanded thermoplastic resin composite beads.

Comparative Example 2

In this example, tubular olefin resin seed beads were initially prepared similarly with the Embodiment 1.

Then, thermoplastic resin composite beads were produced, similarly with the Embodiment 1, except that 50 g of an olefin resin seed bead, and 435 g of styrene and 15 g of butyl acrylate, as a styrene monomer were used. In this example, a through hole of the olefin resin seed beads was closed after polymerization, and substantially spherical thermoplastic resin composite beads were obtained.

Then, a foaming temperature was changed to 165° C., and carbon dioxide was pressed into an autoclave in a way allow the inner pressure of the autoclave to become 4.3 MPa (G). Except for these, similarly with the Embodiment 1, the thermoplastic resin composite beads were foamed and expanded, thereby obtaining expanded thermoplastic resin composite beads.

Similarly with the Embodiment 1, the obtained expanded thermoplastic resin composite beads were molded in a mold, thereby obtaining a foamed molded article formed from expanded thermoplastic resin composite beads.

Comparative Example 3

In this example, similarly with the Embodiment 1, tubular olefin resin seed beads were prepared so as to have a smallest inner diameter P1 of 0.3 (mm), a smallest outer diameter L1 of 1.5 (mm), the value of P1/L1 of 0.2, and a height H of 3.0 (mm), except that conditions under which the extrusion process is performed was changed.

Then, thermoplastic resin composite beads were produced similarly with the Embodiment 1, except that the olefin resin seed beads, prepared in a way described above, were used. In this example, a through hole of the olefin resin seed beads was closed after polymerization, and substantially spherical thermoplastic resin composite beads were obtained.

Thereafter, expanded thermoplastic resin composite beads were produced by foaming and expanding the thermoplastic resin composite beads, similarly with the Embodiment 1, except that a foaming temperature was changed to 165° C.

Similarly with the Embodiment 1, the obtained expanded thermoplastic resin composite beads were molded in a mold, thereby obtaining a foamed molded article formed from expanded thermoplastic resin composite beads.

Comparative Example 4

In this example, tubular olefin resin seed beads were initially prepared similarly with the Embodiment 1.

Then, similarly with the Embodiment 1, a magnesium pyrophosphate slurry, a surfactant, a water-soluble polymerization inhibitor, and olefin resin seed beads of this example were fed into an autoclave. Thereafter, styrene monomers, in which a polymerization initiator and a cross linking agent are dissolved, were additionally fed into the autoclave while being agitated at a rotation speed of 500 rpm.

After the gas phase of the autoclave was replaced with nitrogen gas, the temperature was raised to 88° C. by taking one and a half hours. After the temperature was kept at 88° C. for 30 minutes, the agitation speed was lowered to 450 rpm, and the temperature was cooled to 80° C. by taking 30 minutes. After cooling to 80° C., the temperature was kept at 80° C. for 5 hours. It was confirmed that this 5-hour heating at 80° C. would allow the polymerization conversion rate to become about 90%. Further, the temperature was raised to 120° C. by taking two hours, and then the temperature was kept at 120° C. for 5 hours. Thereafter, the temperature was cooled to 30° C. by taking about six hours.

After cooling, the contents of the autoclave were taken out. Similarly with the Embodiment 1, magnesium pyrophosphate attached on the surface of the beads was dissolved, and cleaning and drying were performed using a centrifuge. In this way, thermoplastic resin composite beads were obtained. In this example, a through hole of the olefin resin seed beads was closed after polymerization, and substantially spherical thermoplastic resin composite beads were obtained.

Then, expanded thermoplastic resin composite beads were produced by foaming and expanding the thermoplastic resin composite beads, similarly with the Embodiment 1, except that a foaming temperature was changed to 165° C.

Similarly with the Embodiment 1, the obtained expanded thermoplastic resin composite beads were molded in a mold, thereby obtaining a foamed molded article formed from expanded thermoplastic resin composite beads.

Comparative Example 5

In this example, tubular olefin resin seed beads were initially prepared similarly with the Embodiment 1.

Then, thermoplastic resin composite beads were produced, similarly with the Embodiment 1, except that 12.0 g of sodium lauryl sulfonate (10 mass % aqueous solution) as a surfactant, 50 g of the olefin resin seed bead of this example, and 435 g of styrene and 15 g of butyl acrylate, both as a styrene monomer, were used. In this example, a through hole of the olefin resin seed beads was closed after polymerization, and thermoplastic resin composite beads having a chain-like shape were obtained.

Then, expanded thermoplastic resin composite beads were produced by foaming and expanding the thermoplastic resin composite beads, similarly with the Embodiment 1, except that a foaming temperature was changed to 165° C.

Similarly with the Embodiment 1, the obtained expanded thermoplastic resin composite beads were molded in a mold, thereby obtaining a foamed molded article formed from expanded thermoplastic resin composite beads.

Comparative Example 6

In this example, similarly with the Embodiment 1, an ethylene-vinyl acetate copolymer, a linear low density polyethylene, and a foaming assistant were initially fed into a Henschel mixer, and they were mixed for 5 minutes. Further, the resin compounds were melt-kneaded in an extruder (IKG Corporation's MS50-28 type, 50 mmφ) single screw extruder, Maddock type screw) at a temperature of 230 to 250° C. Then, the kneaded materials were cut in water into the shape of 0.4 to 0.6 mg/per bead (0.5 mg/per bead, in average). As a result, olefin resin seed beads (seed beads) having no hole and having a substantially spherical shape were obtained.

Then, similarly with the Embodiment 1, a magnesium pyrophosphate slurry, a surfactant, a water-soluble polymerization inhibitor, and olefin resin seed beads of this example were fed into an autoclave. Thereafter, styrene monomers, in which a polymerization initiator and a cross linking agent are dissolved, were additionally fed into the autoclave while being agitated at a rotation speed of 500 rpm.

After the gas phase portion of the autoclave was replaced with nitrogen gas, the temperature was raised to 88° C. by taking one and a half hours. After the temperature was kept at 88° C. for 30 minutes, the agitation speed was lowered to 450 rpm, and the temperature was lowered to 80° C. by taking 30 minutes. After cooling to 80° C., the temperature was kept at 80° C. for 5 hours. It was confirmed that this 5-hour heating at 80° C. would allow the polymerization conversion rate to become about 90%. Further, the temperature was raised to 120° C. by taking two hours, and the temperature was kept at 120° C. for 5 hours. Then, the temperature was cooled to 30° C. by taking about six hours.

After cooling, the contents of the autoclave were taken out. Similarly with the Embodiment 1, magnesium pyrophosphate attached on the surface of the beads was dissolved, and cleaning and drying were performed using a centrifuge. In this way, thermoplastic resin composite beads were obtained. In this example, spherical thermoplastic resin composite beads were obtained.

Then, expanded thermoplastic resin composite beads were produced by foaming and expanding the thermoplastic resin composite beads, similarly with the Embodiment 1, except that a foaming temperature was changed to 165° C.

The obtained expanded thermoplastic resin composite beads were molded in a mold, thereby obtaining a foamed molded article formed from expanded thermoplastic resin composite beads. In this example, the foamed molded article was obtained similarly with the Embodiment 1, except that the steam pressure for molding was changed to 0.02 MPa (G).

Similarly with the Embodiment 1, the dimensions, the melting point Tm, etc., of the olefin resin seed beads obtained according to the Embodiments 2 to 11, and the Comparative Examples 1 to 6, is listed in Tables 1-3 shown later. The amount of the carbon black contained in the olefin resin seed beads according to the Embodiment 8 is listed in Table 2.

Further, similarly with the Embodiment 1, the polymerization condition, the properties, etc., of the thermoplastic resin composite beads according to the Embodiments 2 to 11, and the Comparative Examples 1 to 6, is listed in Tables 1-3 shown later.

Still further, similarly with the Embodiment 1, the foaming conditions, the properties, etc. of the expanded thermoplastic resin composite beads according to the Embodiments 2 to 11, and the Comparative Examples 1 to 6, are listed in Tables 1-3 shown later. As to the Embodiment 9 in which expanded beads were produced by performing a second stage expansion, the inner pressure (MPa (G)) of the expanded beads before the second stage expansion, and a steam pressure (MPa (G)) applied at the second stage expansion×heat time (second) are listed in Table 2 shown later.

In addition, as to the foamed molded articles formed from expanded thermoplastic resin composite beads obtained according to the Embodiments 2 to 11, and the Comparative Examples 1 to 6, the molding condition, the properties, etc., is listed in Tables 1-3 shown later, similarly with the Embodiment 1. The measurement of the bending strength of the foamed molded article formed from expanded thermoplastic resin composite beads according to the Embodiment 11 was performed for the foamed molded article which was molded by charging the expanded thermoplastic resin composite beads into a molding machine having a mold with dimensions of 300×75×25 mm, and fusion-bonding them. In this case, the heating for molding was performed for 14 seconds under a steam pressure for molding of 0.10 MPa (G).

TABLE 1

| | | | Embodiment No. | | | | | |
| --- | --- | --- | --- | --- | --- | --- | --- | --- |
| | | | 1 | 2 | 3 | 4 | 5 | 6 |
| Polymerization Condition | Olefin resin seed bead | Shape | Tubular | Tubular | Tubular | Tubular | Tubular | Tubular |
| | | P1 (mm) | 0.62 | 0.62 | 0.62 | 0.53 | 0.62 | 0.62 |
| | | L1 (mm) | 1.0 | 1.0 | 1.0 | 1.2 | 1.0 | 1.0 |
| | | P1/L1 | 0.62 | 0.62 | 0.62 | 0.44 | 0.62 | 0.62 |
| | | H (mm) | 2.0 | 2.0 | 2.0 | 2.5 | 2.0 | 2.0 |
| | | $P1_H$ (mm) | 0.9 | 0.9 | 0.9 | 0.7 | 0.9 | 0.9 |
| | | $P1_H/P1$ | 1.45 | 1.45 | 1.45 | 1.32 | 1.45 | 1.45 |
| | | Melting point: Tm (° C.) | 102 | 102 | 102 | 102 | 102 | 102 |
| | | Content of carbon black (mass %) | — | — | — | — | — | — |
| | | Amount of styrene monomer (part by mass) | 70 | 85 | 50 | 70 | 70 | 70 |
| | | Amount of olefin resin seed bead (part by mass) | 30 | 15 | 50 | 30 | 30 | 30 |
| | | Polymerization temperature: A (° C.) | 80 | 80 | 80 | 80 | 84 | 65 |
| | | Melting point-Polymerization temperature (Tm − A) (° C.) | 22 | 22 | 22 | 22 | 18 | 37 |
| | | Amount of surfactant (mass ppm) | 300 | 300 | 300 | 300 | 300 | 300 |
| Thermoplastic resin composite bead | | Shape | Tubular | Tubular | Tubular | Tubular | Tubular | Tubular |
| | | P2 (mm) | 1.4 | 1.3 | 1.5 | 0.8 | 1.3 | 1.4 |
| | | L2 (mm) | 2.4 | 2.8 | 2.1 | 2.2 | 2.4 | 2.4 |
| | | P2/L2 | 0.57 | 0.45 | 0.7 | 0.36 | 0.55 | 0.57 |
| Foaming conditions | | Foaming temperature (° C.) | 155 | 160 | 155 | 155 | 155 | 155 |
| | | Type of blowing agent | $CO_2$ | $CO_2$ | $CO_2$ | $CO_2$ | $CO_2$ | $CO_2$ |
| | | Inner pressure of autoclave (MPa (G)) | 4.0 | 4.0 | 3.8 | 4.2 | 4.5 | 4.0 |
| | Second stage expansion | Inner pressure of expanded bead (MPa (G)) | — | — | — | — | — | — |
| | | Steam pressure (MPa (G)) × heat time (second) | — | — | — | — | — | — |
| Expanded thermoplastic resin composite bead | | Shape | Tubular | Tubular | Tubular | Tubular | Tubular | Tubular |
| | | P3 (mm) | 3.2 | 2.8 | 3.8 | 2.21 | 2.9 | 3.2 |
| | | L3 (mm) | 6.3 | 6.7 | 6.0 | 6.1 | 5.5 | 6.3 |
| | | P3/L3 | 0.51 | 0.42 | 0.63 | 0.36 | 0.53 | 0.51 |
| | | Bulk density (kg/m³) | 30 | 30 | 30 | 30 | 30 | 30 |
| | | Average diameter of foam cell (μm) | 110 | 120 | 90 | 130 | 130 | 110 |
| Molding conditions | | Steam source pressure for molding (MPa (G)) | 0.10 | 0.10 | 0.10 | 0.10 | 0.10 | 0.10 |
| | | Heat time (second) | 20 | 20 | 20 | 20 | 20 | 20 |
| Foamed molded article formed from expanded thermoplastic resin composite beads | | Bulk density (kg/m³) | 33 | 33 | 33 | 33 | 33 | 33 |
| | | Fusion-bonding rate (%) | 90 | 80 | 80 | 90 | 90 | 90 |
| | | Porosity (%) | 34 | 20 | 40 | 22 | 16 | 30 |
| | | Sound absorption property | Excellent | Good | Excellent | Good | Good | Excellent |
| | | Bending strength (MPa) | 0.28 | 0.29 | 0.26 | 0.29 | 0.29 | 0.26 |

TABLE 2

| | | | Embodiment No. | | | | |
| --- | --- | --- | --- | --- | --- | --- | --- |
| | | | 7 | 8 | 9 | 10 | 11 |
| Polymerization Condition | Olefin resin seed bead | Shape | Tubular | Tubular | Tubular | Tubular | Tubular |
| | | P1 (mm) | 0.62 | 0.62 | 0.62 | 0.62 | 0.62 |
| | | L1 (mm) | 1.0 | 1.0 | 1.0 | 1.0 | 1.0 |
| | | P1/L1 | 0.62 | 0.62 | 0.62 | 0.62 | 0.62 |
| | | H (mm) | 2.0 | 2.0 | 2.0 | 2.0 | 2.0 |
| | | $P1_H$ (mm) | 0.9 | 0.9 | 0.9 | 0.9 | 0.9 |
| | | $P1_H/P1$ | 1.45 | 1.45 | 1.45 | 1.45 | 1.45 |
| | | Melting point: Tm (° C.) | 102 | 102 | 102 | 102 | 102 |
| | | Content of carbon black (mass %) | — | 1.5 | — | — | — |

TABLE 2-continued

|  |  | Embodiment No. | | | | |
|---|---|---|---|---|---|---|
|  |  | 7 | 8 | 9 | 10 | 11 |
|  | Amount of styrene monomer (part by mass) | 70 | 70 | 70 | 70 | 70 |
|  | Amount of olefin resin seed bead (part by mass) | 30 | 30 | 30 | 30 | 30 |
|  | Polymerization temperature: A (° C.) | 80 | 80 | 80 | 80 | 80 |
|  | Melting point-Polymerization temperature (Tm − A) (° C.) | 22 | 22 | 22 | 22 | 22 |
|  | Amount of surfactant (mass ppm) | 500 | 300 | 300 | 300 | 300 |
| Thermoplastic resin composite bead | Shape | Tubular | Tubular | Tubular | Tubular | Tubular |
|  | P2 (mm) | 1.2 | 1.4 | 1.4 | 1.4 | 1.4 |
|  | L2 (mm) | 2.2 | 2.4 | 2.4 | 2.4 | 2.4 |
|  | P2/L2 | 0.55 | 0.57 | 0.57 | 0.57 | 0.57 |
| Foaming conditions | Foaming temperature (° C.) | 155 | 155 | 155 | — | 155 |
|  | Type of blowing agent | $CO_2$ | $CO_2$ | $CO_2$ | cyclo-hexane, butane | $CO_2$ |
|  | Inner pressure of autoclave (MPa (G)) | 4.0 | 4.0 | 4.0 | — | 4.0 |
| Second stage expansion | Inner pressure of expanded bead (MPa (G)) | — | — | 0.26 | — | — |
|  | Steam pressure (MPa (G)) × heat time (second) | — | — | 0.04 × 15 | — | — |
| Expanded thermoplastic resin composite bead | Shape | Tubular | Tubular | Tubular | Tubular | Tubular |
|  | P3 (mm) | 2.7 | 3.2 | 6.0 | 3.2 | 3.2 |
|  | L3 (mm) | 5.1 | 6.3 | 10.0 | 6.3 | 6.3 |
|  | P3/L3 | 0.53 | 0.51 | 0.6 | 0.51 | 0.51 |
|  | Bulk density (kg/m³) | 30 | 30 | 9 | 30 | 30 |
|  | Average diameter of foam cell (μm) | 100 | 80 | 180 | 30 | 110 |
| Molding conditions | Steam source pressure for molding (MPa (G)) | 0.10 | 0.10 | 0.10 | 0.10 | 0.10 |
|  | Heat time (second) | 20 | 20 | 20 | 20 | 14 |
| Foamed molded article formed from expanded thermoplastic resin composite beads | Bulk density (kg/m³) | 33 | 33 | 10 | 33 | 33 |
|  | Fusion-bonding rate (%) | 90 | 90 | 80 | 90 | 80 |
|  | Porosity (%) | 32 | 36 | 40 | 37 | 45 |
|  | Sound absorption property | Excellent | Excellent | Excellent | Excellent | Excellent |
|  | Bending strength (MPa) | 0.28 | 0.28 | 0.05 | 0.28 | 0.26 |

TABLE 3

|  |  |  | Comparative Example No. | | | | | |
|---|---|---|---|---|---|---|---|---|
|  |  |  | 1 | 2 | 3 | 4 | 5 | 6 |
| Polymerization Condition | Olefin resin seed bead | Shape | Spherical | Tubular | Tubular | Tubular | Tubular | Tubular |
|  |  | P1 (mm) | — | 0.62 | 0.3 | 0.62 | 0.62 | — |
|  |  | L1 (mm) | — | 1.0 | 1.5 | 1.0 | 1.0 | — |
|  |  | P1/L1 | — | 0.62 | 0.2 | 0.62 | 0.62 | — |
|  |  | H (mm) | — | 2.0 | 3.0 | 2.0 | 2.0 | — |
|  |  | $P1_H$ (mm) | — | 0.9 | 0.4 | 0.9 | 0.9 | — |
|  |  | $P1_H/P1$ | — | 1.45 | 1.33 | 1.45 | 1.45 | — |
|  |  | Melting point: Tm (° C.) | 102 | 102 | 102 | 102 | 102 | 102 |
|  |  | Content of carbon black (mass %) | — | — | — | — | — | — |
|  | Amount of styrene monomer (part by mass) |  | 70 | 90 | 70 | 70 | 90 | 70 |
|  | Amount of olefin resin seed bead (part by mass) |  | 30 | 10 | 30 | 30 | 10 | 30 |
|  | Polymerization temperature: A (° C.) |  | 80 | 80 | 80 | 88 | 80 | 88 |
|  | Melting point-Polymerization temperature (Tm − A) (° C.) |  | 22 | 22 | 22 | 14 | 22 | 14 |
|  | Amount of surfactant (mass ppm) |  | 300 | 300 | 300 | 300 | 1200 | 300 |
| Thermoplastic resin composite bead | Shape |  | Spherical | Spherical | Spherical | Spherical | Chain-like shape | Spherical |
|  | P2 (mm) |  | — | — | — | — | — | — |
|  | L2 (mm) |  | — | — | — | — | — | — |
|  | P2/L2 |  | — | — | — | — | — | — |

TABLE 3-continued

| | | Comparative Example No. | | | | | |
|---|---|---|---|---|---|---|---|
| | | 1 | 2 | 3 | 4 | 5 | 6 |
| Foaming conditions | Foaming temperature (° C.) | 165 | 165 | 165 | 165 | 165 | 165 |
| | Type of blowing agent | $CO_2$ | $CO_2$ | $CO_2$ | $CO_2$ | $CO_2$ | $CO_2$ |
| | Inner pressure of autoclave (MPa (G)) | 4.0 | 4.3 | 4.0 | 4.0 | 4.0 | 4.0 |
| Second stage expansion | Inner pressure of expanded bead (MPa (G)) | — | — | — | — | — | — |
| | Steam pressure (MPa (G)) × heat time (second) | — | — | — | — | — | — |
| Expanded thermoplastic resin composite bead | Shape | Spherical | Spherical | Spherical | Spherical | Chain-like shape | Spherical |
| | P3 (mm) | — | — | — | — | — | — |
| | L3 (mm) | — | — | — | — | — | — |
| | P3/L3 | — | — | — | — | — | — |
| | Bulk density (kg/m³) | 30 | 30 | 30 | 30 | 30 | 30 |
| | Average diameter of foam cell (μm) | 100 | 80 | 120 | 110 | 70 | 100 |
| Molding conditions | Steam source pressure for molding (MPa (G)) | 0.10 | 0.10 | 0.10 | 0.10 | 0.10 | 0.02 |
| | Heat time (second) | 20 | 20 | 20 | 20 | 20 | 20 |
| Foamed molded article formed from expanded thermoplastic resin composite beads | Bulk density (kg/m³) | 33 | 33 | 33 | 33 | 33 | 33 |
| | Fusion-bonding rate (%) | 90 | 80 | 90 | 90 | 40 | 80 |
| | Porosity (%) | 3 | 6 | 4 | 3 | 8 | 33 |
| | Sound absorption property | Poor | Poor | Poor | Poor | Poor | Good |
| | Bending strength (MPa) | 0.36 | 0.37 | 0.35 | 0.36 | 0.15 | 0.15 |

As can be seen from Table 1 and Table 2, it is obvious that the tubular thermoplastic resin composite beads according to the Embodiments 1 to 11, and the tubular expanded thermoplastic resin composite beads produced therewith, make possible to produce, by well-known in-mold molding without special equipment, a foamed molded article formed from expanded thermoplastic resin composite beads that has a high porosity, and that has been improved in mutual fusion-bonding of expanded beads and strength. The foamed molded article formed from expanded thermoplastic resin composite beads, which was obtained by through-hole expanded beads, exhibits excellent properties in strength in addition to heat insulating properties, shock absorbing properties, sound absorption properties, permeability and light-weight properties. Accordingly, it may be used, for example, for packaging materials, construction materials, and impact energy absorbing materials for vehicles. Specially, it may be suitably used as an inner material for vehicles such as tibia pads and floor spacer, for example.

On the other hand, as can be seen from Table 3, where a foamed molded article formed from expanded thermoplastic resin composite beads was formed by expanded beads which were prepared using the thermoplastic resin composite beads according to the Comparative Examples 1-5, it was difficult to control the porosity of the foamed molded article, and could not obtain the foamed molded article with a high porosity Thus obtained foamed molded article was degraded in shock absorbing properties, sound absorption properties, and sound insulating properties. Further, the foamed molded article according to Comparative Example 5 could not obtain sufficient mechanical strength.

The foamed molded article formed from expanded thermoplastic resin composite beads that was formed by expanded beads which were prepared using the thermoplastic resin composite beads according to the Comparative Example 6, could attain a high porosity, but failed to obtain sufficient mechanical strength.

The invention claimed is:

1. An open-ended tubular expandable thermoplastic resin composite bead obtained by impregnating an open-ended tubular thermoplastic resin composite bead with a physical blowing agent,
    wherein the thermoplastic resin composite bead comprises 10 to 50 parts by mass of an olefin resin and 50 to 90 parts by mass of a styrene resin,
    the thermoplastic resin composite bead is prepared by impregnating an open-ended tubular olefin resin seed bead with a styrene monomer and polymerizing the styrene monomer, and the amount of the styrene monomer polymerized with the open-ended tubular olefin resin seed bead is 50 to 90 parts by mass per 100 parts by mass of the total amount of the olefin resin seed beads and the styrene monomer,
    wherein the expandable thermoplastic resin composite bead has a smallest inner diameter P2 (mm) of not less than 0.4 mm and a smallest outer diameter L2 (mm), wherein the value of a ratio of P2 to L2 (P2/L2) is 0.3 to 0.8.

2. An open-ended tubular expanded thermoplastic resin composite bead obtained by foaming and expanding the expandable thermoplastic resin composite bead according to claim 1, wherein a bulk density of the expanded thermoplastic resin composite beads is 10 to 500 kg/m³, and the expanded thermoplastic resin composite bead has a smallest inner diameter P3 (mm) of not less than 1.5 mm, and a smallest outer diameter L3 (mm), wherein the value of a ratio of P3 to L3 (P3/L3) is 0.3 to 0.8.

3. A foamed molded article formed from expanded thermoplastic resin composite beads, the article being obtained by molding the expanded thermoplastic resin composite beads according to claim 2 in a mold, wherein the foamed molded article has a bulk density of 10 to 500 kg/m³, a porosity of 10 to 60%, and a degree of fusion-bonding among the expanded beads of 60% or more.

4. The open-ended tubular expandable thermoplastic resin composite bead according to claim 1, wherein the expandable thermoplastic resin composite bead comprises a continuous phase comprised mainly of the olefin resin and a dispersion phase comprised mainly of the styrene resin.

5. The open-ended tubular expandable thermoplastic resin composite bead according to claim 1, wherein the expandable thermoplastic resin composite bead has a morphology formed in a way that a dispersion phase mainly composed of the styrene resin is dispersed into a continuous phase mainly composed of the olefin resin.

6. The open-ended tubular expandable thermoplastic resin composite bead according to claim 1, wherein the expandable thermoplastic resin composite bead has a morphology formed by a co-continuous phase containing a continuous phase that is mainly composed of the styrene resin and a continuous phase that is mainly composed of the olefin resin.

7. The open-ended tubular expandable thermoplastic resin composite bead according to claim 1, wherein the expandable thermoplastic resin composite bead has a sea-island structure in which the continuous phase is the polyolefin resin and the dispersion phase is the styrene resin.

\* \* \* \* \*